United States Patent
Cammenga et al.

(10) Patent No.: US 10,126,624 B2
(45) Date of Patent: Nov. 13, 2018

(54) PRINTED APPLIQUÉ AND METHOD THEREOF

(71) Applicant: Gentex Corporation, Zeeland, MI (US)

(72) Inventors: David J. Cammenga, Zeeland, MI (US); Adam R. Heintzelman, Grand Rapids, MI (US); Joel A. Stray, Hudsonville, MI (US); Autumn W. Trombka, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/270,370

(22) Filed: Sep. 20, 2016

(65) Prior Publication Data
US 2017/0010513 A1 Jan. 12, 2017

Related U.S. Application Data

(62) Division of application No. 14/150,408, filed on Jan. 8, 2014, now Pat. No. 9,488,892.
(Continued)

(51) Int. Cl.
*G02F 1/15* (2006.01)
*G02F 1/157* (2006.01)
(Continued)

(52) U.S. Cl.
CPC .............. *G02F 1/157* (2013.01); *B60R 1/088* (2013.01); *B60R 1/1207* (2013.01); *G02B 5/205* (2013.01); *G02F 2202/28* (2013.01)

(58) Field of Classification Search
CPC ........ G02F 1/163; G02F 1/1525; G02F 1/167; G02F 1/0018; G02F 1/133553;
(Continued)

(56) References Cited

U.S. PATENT DOCUMENTS 3,266,016 A 8/1966 Maruyama et al.
3,280,701 A 10/1966 Donnelly et al.
(Continued)

FOREIGN PATENT DOCUMENTS

EP 0728618 8/1996
JP 56143416 11/1981

OTHER PUBLICATIONS

Creative Materials, Inc., Description of Pressure Sensitive Tape, series 300-01; available at http://creativematerials.com; 1 page.
(Continued)

*Primary Examiner* — Mahidere Sahle
(74) *Attorney, Agent, or Firm* — Price Heneveld LLP; Bradley D. Johnson

(57) ABSTRACT

An electro-optic assembly is disclosed. The assembly comprises a front substrate having a first surface and a second surface substantially parallel to the first surface; a rear substrate spaced from and substantially parallel to the front substrate. The rear substrate comprises a third surface and a fourth surface substantially parallel to the third surface. The assembly further comprises an electrical contact for providing an electrical connection to an electrode in proximity to an electro-optic material and an appliqué layer. The appliqué layer is on at least a portion of the fourth surface and forms a contact-obscuring.

19 Claims, 8 Drawing Sheets

Related U.S. Application Data

(60) Provisional application No. 61/750,441, filed on Jan. 9, 2013.

(51) Int. Cl.
  B60R 1/12 (2006.01)
  B60R 1/08 (2006.01)
  G02B 5/20 (2006.01)

(58) Field of Classification Search
  CPC ..... G02F 2001/1519; G02F 2001/1515; G02F 2202/28
  USPC .................................................. 359/245–279
  See application file for complete search history.

(56) References Cited

U.S. PATENT DOCUMENTS

| | | |
|---|---|---|
| 3,837,129 A | 9/1974 | Losell |
| 4,588,267 A | 5/1986 | Pastore |
| 4,630,904 A | 12/1986 | Pastore |
| 4,741,603 A | 5/1988 | Miyagi et al. |
| 4,882,565 A | 11/1989 | Gallmeyer |
| 4,902,108 A | 2/1990 | Byker |
| 5,014,167 A | 5/1991 | Roberts |
| 5,052,163 A | 10/1991 | Czekala |
| 5,066,112 A | 11/1991 | Lynam et al. |
| 5,069,535 A | 12/1991 | Baucke et al. |
| 5,073,012 A | 12/1991 | Lynam |
| 5,076,673 A | 12/1991 | Lynam et al. |
| 5,115,346 A | 5/1992 | Lynam |
| 5,128,799 A | 7/1992 | Byker |
| 5,136,419 A | 8/1992 | Shabrang |
| 5,151,824 A | 9/1992 | O'Farrell |
| 5,158,638 A | 10/1992 | Osanami et al. |
| 5,189,537 A | 2/1993 | O'Farrell |
| 5,207,492 A | 5/1993 | Roberts |
| 5,253,109 A | 10/1993 | O'Farrell et al. |
| 5,278,693 A | 1/1994 | Theiste |
| 5,280,380 A | 1/1994 | Byker |
| 5,282,077 A | 1/1994 | Byker |
| 5,285,060 A | 2/1994 | Larson et al. |
| 5,294,376 A | 3/1994 | Byker |
| 5,313,335 A | 5/1994 | Gray et al. |
| 5,336,448 A | 8/1994 | Byker |
| 5,355,284 A | 10/1994 | Roberts |
| 5,361,190 A | 11/1994 | Roberts et al. |
| 5,379,146 A | 1/1995 | Defendini |
| 5,416,313 A | 5/1995 | Larson et al. |
| 5,421,940 A | 6/1995 | Cornils et al. |
| 5,426,568 A | 6/1995 | Lamers et al. |
| 5,446,576 A | 8/1995 | Lynam et al. |
| 5,448,397 A | 9/1995 | Tonar |
| D363,920 S | 11/1995 | Roberts et al. |
| 5,481,409 A | 1/1996 | Roberts |
| 5,504,478 A | 4/1996 | Knapp |
| 5,528,422 A | 6/1996 | Roberts |
| 5,587,699 A | 12/1996 | Faloon et al. |
| 5,619,374 A | 4/1997 | Roberts |
| 5,619,375 A | 4/1997 | Roberts |
| 5,649,756 A | 7/1997 | Adams et al. |
| 5,660,457 A | 8/1997 | Lyons |
| 5,668,663 A | 9/1997 | Varaprasad et al. |
| 5,669,704 A | 9/1997 | Pastrick |
| 5,669,705 A | 9/1997 | Pastrick et al. |
| 5,679,283 A | 10/1997 | Tonar |
| 5,682,267 A | 10/1997 | Tonar |
| 5,689,370 A | 11/1997 | Tonar |
| 5,724,187 A | 3/1998 | Varaprasad et al. |
| 5,742,026 A | 4/1998 | Dickinson |
| D394,833 S | 6/1998 | Muth |
| 5,760,962 A | 6/1998 | Schofield et al. |
| 5,788,357 A | 8/1998 | Muth et al. |
| 5,790,298 A | 8/1998 | Tonar |
| 5,803,579 A | 9/1998 | Turnbull |
| 5,808,778 A | 9/1998 | Bauer et al. |
| 5,818,625 A | 10/1998 | Forgette et al. |
| 5,825,527 A | 10/1998 | Forgette et al. |
| 5,837,994 A | 11/1998 | Stam |
| 5,863,116 A | 1/1999 | Pastrick et al. |
| 5,888,431 A | 3/1999 | Tonar et al. |
| D409,540 S | 5/1999 | Muth |
| D410,607 S | 6/1999 | Carter |
| 5,923,027 A | 7/1999 | Stam |
| 5,923,457 A | 7/1999 | Byker et al. |
| 5,928,572 A | 7/1999 | Tonar et al. |
| 5,929,786 A | 7/1999 | Schofield et al. |
| 5,940,201 A | 8/1999 | Ash et al. |
| 5,956,012 A | 9/1999 | Turnbull et al. |
| 5,959,367 A | 9/1999 | O'Farrell et al. |
| 5,990,469 A | 11/1999 | Bechtel |
| 5,998,617 A | 12/1999 | Srinivasa |
| 6,002,511 A | 12/1999 | Varaprasad |
| 6,005,724 A | 12/1999 | Todd |
| 6,007,222 A | 12/1999 | Thau |
| 6,008,486 A | 12/1999 | Stam |
| 6,020,987 A | 2/2000 | Baumann |
| 6,023,040 A | 2/2000 | Zahavi |
| 6,023,229 A | 2/2000 | Bugno et al. |
| 6,037,471 A | 3/2000 | Srinivasa |
| 6,043,452 A | 3/2000 | Bestenlehrer |
| 6,045,243 A | 4/2000 | Muth et al. |
| 6,049,171 A | 4/2000 | Stam |
| 6,051,956 A | 4/2000 | Nakashimo |
| D425,466 S | 5/2000 | Todd et al. |
| 6,062,920 A | 5/2000 | Jordan |
| 6,064,508 A | 5/2000 | Forgette et al. |
| 6,064,509 A | 5/2000 | Tonar et al. |
| 6,064,525 A | 5/2000 | Depauw |
| 6,068,380 A | 5/2000 | Lynn et al. |
| D426,506 S | 6/2000 | Todd et al. |
| D426,507 S | 6/2000 | Todd et al. |
| D427,128 S | 6/2000 | Mathieu |
| 6,076,948 A | 6/2000 | Bukosky et al. |
| D428,372 S | 7/2000 | Todd et al. |
| D428,373 S | 7/2000 | Todd et al. |
| 6,084,700 A | 7/2000 | Knapp |
| 6,086,229 A | 7/2000 | Pastrick |
| 6,093,976 A | 7/2000 | Kramer et al. |
| D428,842 S | 8/2000 | Todd et al. |
| D429,202 S | 8/2000 | Todd et al. |
| D430,088 S | 8/2000 | Todd et al. |
| 6,102,546 A | 8/2000 | Carter |
| 6,106,121 A | 8/2000 | Buckley et al. |
| 6,111,683 A | 8/2000 | Cammenga |
| 6,111,684 A | 8/2000 | Forgette |
| 6,130,421 A | 10/2000 | Bechtel |
| 6,130,448 A | 10/2000 | Bauer et al. |
| 6,132,072 A | 10/2000 | Turnbull |
| 6,140,933 A | 10/2000 | Bugno |
| 6,142,656 A | 11/2000 | Kurth |
| 6,163,083 A | 12/2000 | Kramer et al. |
| 6,166,848 A | 12/2000 | Cammenga et al. |
| 6,170,956 B1 | 1/2001 | Rumsey et al. |
| 6,175,164 B1 | 1/2001 | O'Farrell et al. |
| 6,176,602 B1 | 1/2001 | Pastrick et al. |
| 6,188,505 B1 | 2/2001 | Lomprey |
| 6,193,378 B1 | 2/2001 | Tonar et al. |
| 6,193,912 B1 | 2/2001 | Theiste |
| 6,195,194 B1 | 2/2001 | Roberts et al. |
| 6,222,177 B1 | 4/2001 | Bechtel |
| 6,224,716 B1 | 5/2001 | Yoder |
| 6,229,435 B1 | 5/2001 | Knapp |
| 6,239,898 B1 | 5/2001 | Byker |
| 6,239,899 B1 | 5/2001 | DeVries et al. |
| 6,244,716 B1 | 6/2001 | Steenwyk |
| 6,246,507 B1 | 6/2001 | Bauer |
| 6,247,819 B1 | 6/2001 | Turnbull |
| 6,249,369 B1 | 6/2001 | Theiste et al. |
| 6,255,639 B1 | 7/2001 | Stam |
| 6,262,831 B1 | 7/2001 | Bauer |
| 6,262,832 B1 | 7/2001 | Lomprey |
| 6,268,950 B1 | 7/2001 | Ash |
| 6,281,632 B1 | 8/2001 | Stam |

(56) References Cited

U.S. PATENT DOCUMENTS

| | | |
|---|---|---|
| 6,291,812 B1 | 9/2001 | Bechtel |
| 6,313,457 B1 | 11/2001 | Bauer |
| 6,317,248 B1 | 11/2001 | Agrawal et al. |
| 6,335,548 B1 | 1/2002 | Roberts |
| 6,356,376 B1 | 3/2002 | Tonar |
| 6,359,274 B1 | 3/2002 | Nixon |
| 6,379,013 B1 | 4/2002 | Bechtel |
| 6,392,783 B1 | 5/2002 | Lomprey |
| 6,402,328 B1 | 6/2002 | Bechtel |
| 6,403,942 B1 | 6/2002 | Stam |
| 6,407,468 B1 | 6/2002 | Levesque et al. |
| 6,407,847 B1 | 6/2002 | Poll et al. |
| 6,420,800 B1 | 7/2002 | Levesque |
| 6,426,485 B1 | 7/2002 | Bulgajewski |
| 6,429,594 B1 | 8/2002 | Stam |
| 6,441,943 B1 | 8/2002 | Roberts |
| 6,465,963 B1 | 10/2002 | Turnbull |
| 6,469,739 B1 | 10/2002 | Bechtel |
| 6,471,362 B1 | 10/2002 | Carter |
| 6,504,142 B2 | 1/2003 | Nixon |
| 6,512,624 B2 | 1/2003 | Tonar |
| 6,521,916 B2 | 2/2003 | Roberts |
| 6,523,976 B1 | 2/2003 | Turnbull |
| 6,545,794 B2 | 4/2003 | Ash |
| 6,587,573 B1 | 7/2003 | Stam |
| 6,606,183 B2 | 8/2003 | Ikai et al. |
| 6,614,579 B2 | 9/2003 | Roberts et al. |
| 6,635,194 B2 | 10/2003 | Kloeppner |
| 6,650,457 B2 | 11/2003 | Busscher et al. |
| 6,657,767 B2 | 12/2003 | Bonardi |
| 6,700,692 B2 | 3/2004 | Tonar |
| 6,774,988 B2 | 8/2004 | Stam |
| 6,781,738 B2 | 11/2004 | Kikuchi et al. |
| 6,816,297 B1 | 11/2004 | Tonar |
| 6,861,809 B2 | 3/2005 | Stam |
| 6,870,655 B1 | 3/2005 | Northman et al. |
| 6,870,656 B2 | 3/2005 | Tonar et al. |
| 6,968,273 B2 | 11/2005 | Ockerse |
| 7,042,616 B2 | 5/2006 | Tonar et al. |
| 7,064,882 B2 | 6/2006 | Tonar |
| 7,287,868 B2 | 10/2007 | Carter |
| 7,324,261 B2 | 1/2008 | Tonar et al. |
| 7,342,707 B2 | 3/2008 | Roberts |
| 7,417,717 B2 | 8/2008 | Pack |
| 7,542,193 B2 | 6/2009 | McCabe et al. |
| 7,592,563 B2 | 9/2009 | Wissenbach |
| 7,612,929 B2 | 11/2009 | Tonar et al. |
| 7,663,798 B2 | 2/2010 | Tonar |
| 7,688,495 B2 | 3/2010 | Tonar et al. |
| 7,706,046 B2 | 4/2010 | Bauer et al. |
| 7,746,534 B2 | 6/2010 | Tonar et al. |
| 7,817,020 B2 | 10/2010 | Turnbull et al. |
| 7,830,583 B2 | 11/2010 | Neuman et al. |
| 7,864,399 B2 | 1/2011 | McCabe et al. |
| 7,978,393 B2 | 7/2011 | Tonar et al. |
| 8,004,741 B2 | 8/2011 | Tonar et al. |
| 8,035,881 B2 | 10/2011 | Luten |
| 8,154,418 B2 | 4/2012 | Peterson et al. |
| 8,169,684 B2 | 5/2012 | Bugno et al. |
| 8,730,553 B2 | 5/2014 | Dewind et al. |
| 2002/0021481 A1 | 2/2002 | Lin et al. |
| 2005/0007645 A1 | 1/2005 | Tonar et al. |
| 2006/0181419 A1 | 8/2006 | Chen et al. |
| 2008/0212189 A1* | 9/2008 | Baur ................ B32B 17/10174 359/604 |
| 2008/0297879 A1 | 12/2008 | Tonar et al. |
| 2008/0302657 A1 | 12/2008 | Luten et al. |
| 2009/0296190 A1 | 12/2009 | Anderson et al. |
| 2010/0110553 A1 | 5/2010 | Anderson et al. |
| 2010/0277786 A1 | 11/2010 | Anderson et al. |
| 2010/0321758 A1 | 12/2010 | Bugno et al. |
| 2011/0168687 A1 | 7/2011 | Door |
| 2011/0176323 A1 | 7/2011 | Skiver et al. |
| 2011/0181727 A1 | 7/2011 | Weller et al. |
| 2012/0033285 A1* | 2/2012 | Baumann ................ B60R 1/088 359/267 |
| 2012/0038964 A1 | 2/2012 | De Wind et al. |
| 2012/0069444 A1 | 3/2012 | Campbell et al. |
| 2012/0224248 A1 | 9/2012 | Schofield et al. |
| 2012/0229882 A1 | 9/2012 | Fish, Jr. et al. |
| 2013/0112679 A1 | 5/2013 | Van Wyhe et al. |
| 2013/0170013 A1 | 7/2013 | Tonar et al. |
| 2014/0022390 A1 | 1/2014 | Blank et al. |

OTHER PUBLICATIONS

3M, Inc., Brochure; Reliable Tapes for the Solar Industry; 8 pages; available at the website of 3M, Inc.

3M, Inc., Brochure; Adhesive Transfer Tape with 300LSE Adhesive; 4 pages; available at the website of 3M, Inc.

3M, Inc., Brochure; Double Coated Polyethylene Foam Tapes; 4 pages; available at the website of 3M, Inc.

Patent Cooperation Treaty, International Searching Authority, International Search Report, Written Opinion of the International Searching Authority and Notification of Transmittal, May 7, 2014, 9 Pages.

1998 Ford Expedition Brochure, 12 pages, Aug. 1997.

Muth Advanced Technologies Smart Mirror Brochure, (no date).

Muth Advanced Technologies Signal Mirror Brochure, (no date).

International Body Engineering Conference material, "Dichroic Mirrors with Semi-active Covert Displays," John Roberts, 1993, pp. 65-70.

\* cited by examiner

PRINTED APPLIQUÉ AND METHOD THEREOF

This application is a divisional of pending U.S. patent application Ser. No. 14/150,408, filed Jan. 8, 2014, now U.S. Pat. No. 9,488,892, entitled "PRINTED APPLIQUÉ AND METHOD THEREOF," which claims benefit under 35 USC § 119(e) of provisional application Ser. No. 61/750,441, filed Jan. 9, 2013, entitled PRINTED APPLIQUÉ AND METHOD THEREOF, the entire contents of which are incorporated herein by reference.

FIELD

The disclosure generally relates to an electro-optic assembly, and more particularly, to a rearview mirror assembly with a printed appliqué and method thereof.

SUMMARY

According to one aspect of the disclosure, a rearview mirror assembly is provided that includes a mirror element comprising a front substrate having a first surface and a second surface, and a rear substrate spaced from and substantially parallel to said front substrate, the rear substrate having a third surface and a fourth surface. The front and rear substrates define a cavity at least partially filled with an electro-optic material. The rearview mirror assembly also includes a carrier configured to be connected the mirror element; an appliqué on at least part of the fourth surface, the appliqué defining openings where no appliqué is applied on the fourth surface; and an adhesive in at least part of the opening, the adhesive configured to attach to the mirror element and the carrier. The appliqué and adhesive are configured to substantially have a visual match, and the bond strength and area of the adhesive are adequate to support the mirror element.

According to an aspect of the disclosure, an electro-optic assembly is provided that includes a front substrate having a first surface and a second surface substantially parallel to the first surface; a rear substrate spaced from and substantially parallel to the front substrate, the rear substrate having a third surface and a fourth surface substantially parallel to the third surface; and a carrier operably connected to at least one of the front substrate and the rear substrate. The electro-optic assembly also includes an appliqué on at least a first portion of the fourth surface and having an opening over a second portion of the fourth surface, the portions of the fourth surface in a transmissive region of the rear substrate; and an adhesive at least partially in the opening on the second portion of the fourth surface to connect at least one of the front substrate and the rear substrate to the carrier. The front and rear substrates define a cavity at least partially filled with an electro-optic material, and the carrier and adhesive provide support to at least one of the front substrate and the rear substrate. The appliqué and the adhesive are configured to substantially match in visual appearance through the front and rear substrates.

According to a further aspect of the disclosure, an electro-optic assembly is provided that includes a front substrate having a first surface and a second surface substantially parallel to the first surface; and a rear substrate spaced from and substantially parallel to the front substrate, the rear substrate having a third surface and a fourth surface substantially parallel to the third surface. The electro-optic assembly further includes an electrical contact for providing an electrical connection to an electrode in proximity to an electro-optic material, the contact having an extension at least partially over a transmissive portion of the fourth surface in a transmissive region of the rear substrate; and an appliqué on at least the transmissive portion of the fourth surface, the appliqué having a contact-obscuring region in proximity to the extension of the electrical contact. The front and rear substrates define a cavity at least partially filled with the electro-optic material that is confined within the cavity by a seal substantially between the second surface and the third surface.

According to an additional aspect of the disclosure, an electro-optic assembly is provided that includes a front substrate having a first surface and a second surface substantially parallel to the first surface; and a rear substrate spaced from and substantially parallel to the front substrate, the rear substrate having a third surface and a fourth surface substantially parallel to the third surface. The electro-optic assembly further includes an electrical contact for providing an electrical connection to an electrode in proximity to an electro-optic material, the contact having an extension at least partially over a transmissive portion of the fourth surface in a transmissive region of the rear substrate; and an appliqué on at least the transmissive portion of the fourth surface, the appliqué having a contact-obscuring region that is located between the extension of the electrical contact and the fourth surface. The front and rear substrates define a cavity at least partially filled with the electro-optic material that is confined within the cavity by a seal substantially between the second surface and the third surface. The contact-obscuring region of the appliqué is configured to obscure the visual appearance of the extension of the electrical contact through the front and rear substrates.

According to a further aspect of the disclosure, an electro-optic assembly is provided that includes a front substrate having a first surface and a second surface substantially parallel to the first surface; and a rear substrate spaced from and substantially parallel to the front substrate, the rear substrate having a third surface and a fourth surface substantially parallel to the third surface. The electro-optic assembly further includes an electrical contact for providing an electrical connection to an electrode in proximity to an electro-optic material, the contact having an extension at least partially over a transmissive portion of the fourth surface in a transmissive region of the rear substrate; an adhesive pad between the extension of the electrical contact and the fourth surface; and an appliqué on at least the transmissive portion of the fourth surface, the appliqué having an obscuring region that is located in proximity to at least a portion of the adhesive pad. The front and rear substrates define a cavity at least partially filled with the electro-optic material that is confined within the cavity by a seal substantially between the second surface and the third surface. The obscuring region of the appliqué is configured to obscure the visual appearance of one of, or both of, the extension of the electrical contact and the adhesive pad through the front and rear substrates.

According to an additional aspect of the disclosure, an electro-optic assembly is provided that includes a front substrate having a first surface and a second surface substantially parallel to the first surface; and a rear substrate spaced from and substantially parallel to the front substrate, the rear substrate having a third surface and a fourth surface substantially parallel to the third surface. The electro-optic assembly further includes an electrical contact for providing an electrical connection to an electrode in proximity to an electro-optic material, the contact having an extension at least partially over a transmissive portion of the fourth surface in a transmissive region of the rear substrate; and an appliqué on at least the transmissive portion of the fourth surface, the appliqué having a contact-obscuring region that is located over at least a portion of the extension of the electrical contact. The front and rear substrates define a cavity at least partially filled with the electro-optic material that is confined within the cavity by a seal substantially between the second surface and the third surface. The contact-obscuring region of the appliqué and the extension of the electrical contact are configured to substantially match in visual appearance through the front and rear substrates.

According to a further aspect of the disclosure, an electro-optic assembly includes a front substrate having a first surface and a second surface substantially parallel to the first surface; a rear substrate spaced from and substantially parallel to the front substrate, the rear substrate having a third surface and a fourth surface substantially parallel to the third surface; and a carrier operably connected to at least one of the front substrate and the rear substrate. The electro-optic assembly further includes an appliqué layer directly on at least a first portion of the fourth surface and having an opening over a second portion of the fourth surface, the portions of the fourth surface in a transmissive region of the rear substrate; and an assembly component that is coupled to the carrier, behind the fourth surface and substantially coincident with the opening. The front and rear substrates define a cavity at least partially filled with an electro-optic material.

According to an additional aspect of the disclosure, an electro-optic assembly is provided that includes a front substrate having a first surface and a second surface substantially parallel to the first surface; a rear substrate spaced from and substantially parallel to the front substrate, the rear substrate having a third surface and a fourth surface substantially parallel to the third surface; and an appliqué layer directly on at least a first portion of the fourth surface and having an opening and a discontinuous element over a second portion of the fourth surface, the portions of the fourth surface in a transmissive region of the rear substrate. The front and rear substrates define a cavity at least partially filled with an electro-optic material.

These and other features, advantages, and objects of the present invention will be further understood and appreciated by those with ordinary skill in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

Figure 1:
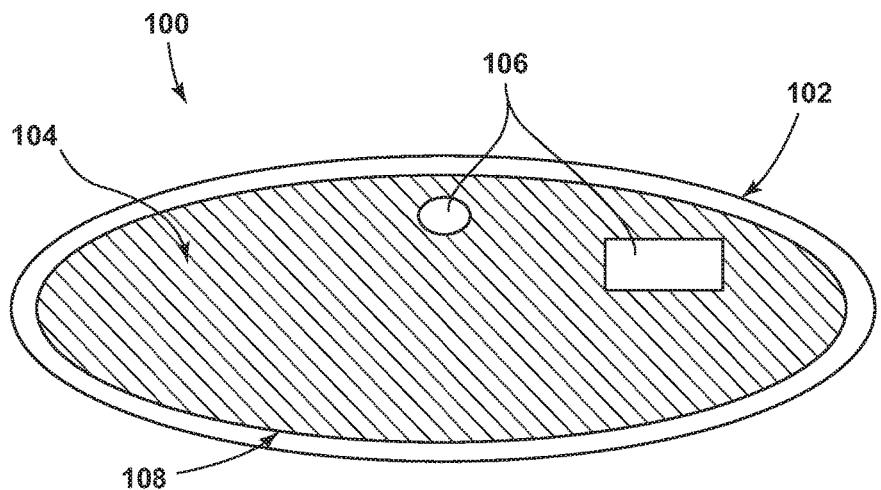
FIG. 1 is a front view diagram of a rearview mirror assembly, in accordance with one exemplary embodiment.

The present illustrated embodiments reside primarily in combinations of method steps and apparatus components related to a printed appliqué and method thereof. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In reference to FIG. 1, an electro-optic assembly in the form of a transflective mirror assembly is generally shown at reference identifier 100. The mirror assembly 100 can be partially reflective and partially transmissive. The mirror assembly 100 can include a mirror assembly edge 102 and an appliqué 104. According to one embodiment, the appliqué 104 can define an opening 106. The mirror assembly 100 can also include a mirror element generally indicated at 108. The mirror assembly edge 102 can be integrated with the mirror element 108 or be a separate component.

Figure 2:
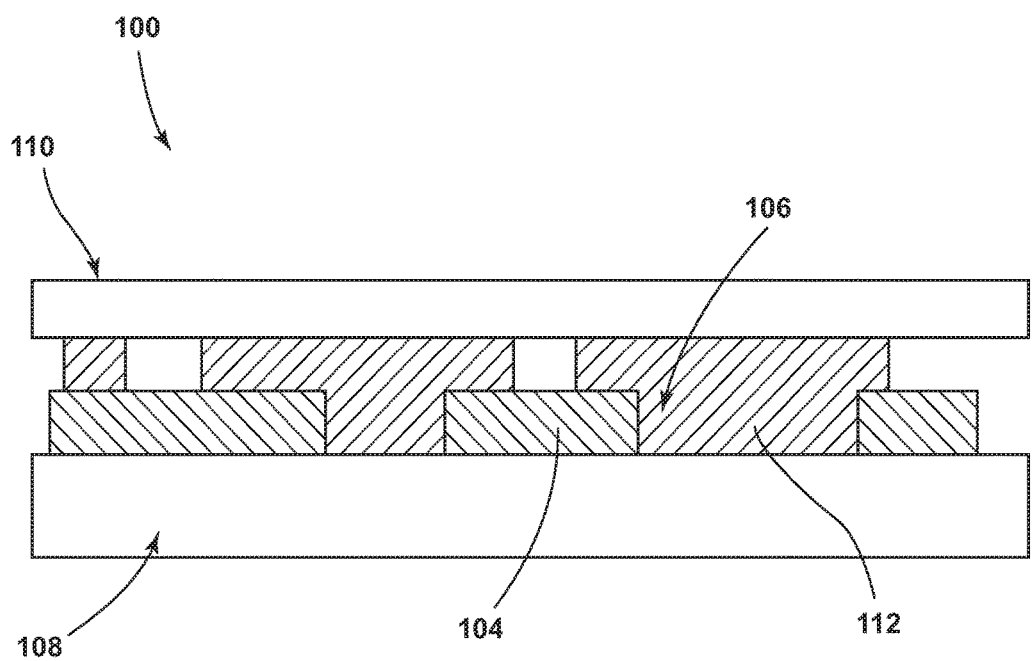
FIG. 2 is a cross-sectional view of a rearview mirror assembly, in accordance with an exemplary embodiment.

With respect to FIG. 2, an additional electro-optic assembly in the form of a transflective mirror assembly is generally shown at reference identifier 100. The mirror assembly 100 can include a carrier 110 configured to attach to the mirror element 108. In some embodiments, carrier 110 is a housing element of the mirror assembly 100 that is attached to one or more of the substrates 114, 120 (see, e.g., FIG. 2A). Carrier 110 may also include other components of the mirror assembly 100 attached to one or more of the substrates 114, 120 including, but not limited to, a circuit board, an electronics board, a mount (e.g., an element that functions to suspend the mirror assembly 100 from a windshield), a board holder, an element mechanically connected to a bezel surrounding the assembly 100, and/or any other component which may provide some structural support to substrates 114 and/or 120. According to one embodiment, an adhesive 112 can be used to attach the carrier 110 and the mirror element 108. The appliqué 104 can be on a surface of the mirror element 108. In some embodiments, mirror assembly 100 is an electro-optic assembly.

FIGS. 2A, 3, 4, 4A, 5, 6, 6A-6D, and 7, each illustrate various embodiments of the mirror assembly 100, each an electro-optic assembly in the form of a transflective mirror assembly, wherein the mirror element 108 is an electro-optic element. The mirror element 108 can include a first substrate 114 having a first surface 116 and a second surface 118 and a second substrate 120 having a third surface 122 and a fourth surface 124, wherein the first and second substrates 114, 120 define a cavity 126. In some embodiments, the second surface 118 is substantially parallel to the first surface 116. In further embodiments, the first substrate 114 and the second substrate 120 are oriented toward the front and the rear of the mirror assembly 100, respectively. The second substrate 120 can be spaced from and substantially parallel to the first substrate 114. According to an exemplary embodiment, the fourth surface 124 is arranged substantially parallel to the third surface 122.

The cavity 126 can contain an electro-optic medium 128, such as, but not limited to, an electrochromic medium. The cavity 126 may be completely or partially filled with the medium 128. The mirror assembly 100 can also include an electrical contact 130, a conductive seal 132, a seal 134, an opaque region 136, a substantially transparent coating 138 on the second surface 118, and a partially reflective, partially transmissive layer 140 (e.g., a transflective coating) on the third surface 122. In such embodiments, the appliqué 104 can be on the fourth surface 124 of the second substrate 120, e.g., in an optically transmissive region of the mirror assembly 100. The contact 130, for example, may be employed to provide an electrical connection to an electrode located on the first or second substrate, 114 or 120, respectively, that is located in proximity to the electro-optic medium 128. According to some embodiments, electrical contact 130 can be in the form of an electrical contact clip, conductive epoxy, a wire, solder, conductive particles, conductive nanoparticles, conductive adhesive, and combinations of these forms of contact 130, configured as understood by those with ordinary skill in the field to convey electrical current.

According to an embodiment of the mirror assembly 100, a substantial portion of the mirror element 108 (including substrates 114 and 120 and their surfaces 116, 118, 122, and 124, respectively) is transmissive insofar as it has an optical transmission of 5% or greater. For example, one half (e.g., the right half) of the mirror element 108 may be substantially or completely opaque, while the other half (e.g., the left half) is semitransparent with an optical transmission of 5% or greater. As another example, perimeter portions of the mirror element 108 could be substantially or completely opaque, while the central portion of the mirror element 108 is transmissive with an optical transmission of 5% or greater. In some embodiments, the mirror element 108 has a substantial portion with an optical transmission greater than 10%. In at least one embodiment, a substantial portion of the mirror element 108 has an optical transmission of approximately 25% or greater. In an additional embodiment, a substantial portion of the mirror element 108 has an optical transmission from approximately 20 to 50%. Further, a substantial portion of the mirror element 108 can be characterized by approximately 22%, 26%, or 40% optical transmission levels.

For mirror elements 108 having a substantial portion with 5% or greater optical transmission, it can be desirable to have a substantially uniform backing behind the mirror to prevent the user from seeing inconsistencies in the viewed image under typical, ambient lighting conditions. In some embodiments, automotive mirrors with greater than 5% optical transmission have used a plastic film for the appliqué 104 to provide the desired uniform background. Typically, the appliqué material will have one or more openings so that light may pass through the material for a sensor or for viewing a display. The film employed as the appliqué 104 can also cover the entire transflective portion of the mirror element 108. The plastic film can be either adhered to the back of the second substrate 120 or held in a generally fixed position behind the substrate 120 with an air gap between the substrate and the film. If there are areas of the surface of the mirror element 108 hidden behind a perimeter bezel or behind an opaque ring around the periphery of the mirror, the appliqué 104 typically will extend into this opaque area. There is no need for the appliqué 104 to extend to the edges of the mirror substrate if the edge area (see, e.g., mirror assembly edge 102 in FIG. 1) is substantially or completely opaque. In some cases, the transparent area or areas of the appliqué 104 may contain a transparent or diffusing film which will still allow light to pass through. For example, the appliqué 104 may be a transparent film where at least a portion is modified with an additive process such as printing or lamination to generate opaque areas while other areas remain transparent.

In reference to the various embodiments illustrated in FIGS. 1-7, the appliqué 104 can be where the appliqué is substantially or completely opaque and the openings 106 in the appliqué can be transparent. Although the appliqué 104 may have a matte or glossy finish, it typically does not contain or embody, at least in substantial part, specular materials having a reflective or mirror-like appearance. The opening 106 may be completely devoid of appliqué material or it may include a transparent or semitransparent film that allows light to pass through it either specularly or with scattering.

There are mirror assemblies 100 where a standard full-surface appliqué (e.g., a plastic film) is not the best choice for the appliqué 104. Black ink (Direct Color Systems®—1-7102-200) is a viable substitute and can be applied to the back of a glass mirror substrate (see, e.g., the second substrate 120 shown in FIG. 2A) with an inkjet process using the Direct Color Systems® Direct Jet 1024 printer to serve as the appliqué 104. Other methods besides inkjet processes could be used to apply the ink for appliqué 104 including, but not limited to, screen printing techniques. The mirror assembly 100 is attached to a housing using an adhesive 112 between the printed appliqué 104 and a support plate (e.g., carrier 110 shown in FIG. 2) behind the mirror element 108. In these embodiments, since the ink employed as the appliqué 104 can be peeled off of the glass surface, the adhesion of the appliqué 104 to the glass surface is deemed insufficient to support the weight of the mirror, such as, but not limited to, for long durations or when exposed to changes in temperature, high humidity, or under other testing procedure typical of the automotive industry.

According to one embodiment, the mirror assembly 100 has a substantially or completely opaque area around the perimeter, and that area may be used for the adhesive 112. In at least one embodiment, openings (see, e.g., openings 106 shown in FIGS. 1 and 2A) can be left in the printed appliqué 104 that can be later filled with a liquid adhesive for use as adhesive 112. FIG. 2 illustrates how openings 106 in the printed appliqué 104 provide areas for the adhesive 112. For a transflective mirror assembly 100, it can be desirable that the color, texture, gloss, and/or reflectance of the printed appliqué 104 (e.g., applied as a black ink) are visually similar to that of the adhesive 112 so that the user will view a substantially uniform surface in all types of lighting under the lighting conditions of the application for the assembly 100, including bright, off-angle lighting conditions. In some embodiments, the adhesive 112 may extend into the openings 106 and also past the edges of the openings 106 over and/or under the appliqué 104.

Figure 2A:
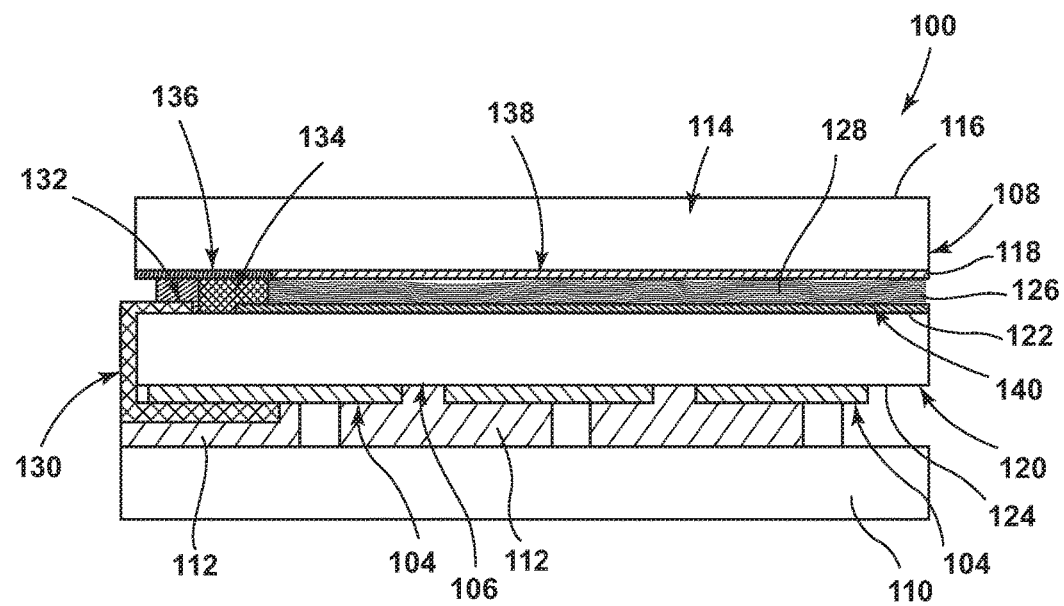
FIG. 2A is a cross-sectional view of a rearview mirror assembly, in accordance with a further exemplary embodiment.

According to one embodiment, as depicted in FIG. 2A, a mirror assembly 100 includes a carrier 110 operably connected to the second substrate 120. The appliqué 104 is located on at least a portion of the fourth surface 124. Further, the appliqué 104 also includes one or more openings 106 over other portions of the fourth surface 124. The mirror assembly 100 also includes adhesive 112 that is at least partially in the opening(s) 106 on the other portions of the fourth surface 124.

According to an embodiment, reducing or eliminating air pockets in the adhesive 112 can improve the mirror appearance since an air pocket in the adhesive may create an area on the back surface of the second substrate 120 that may be visible when viewed in certain lighting conditions. The adhesive 112 serves to connect at least one of the first and second substrates 114 and 120 to the carrier 110. The appliqué 104 and adhesive 112 employed in the mirror assembly 100 according to these embodiments are configured, selected, or otherwise modified to substantially match in visual appearance. In some embodiments, the appliqué 104 and adhesive 112 are matched such that they are substantially indistinguishable as viewed by an observer through the transmissive portions of the substrates 114 and 120. Carrier 110 can also be operably connected with adhesive 112 to the first substrate 114, or both the first and second substrates 114 and 120.

In one exemplary embodiment of the mirror assembly 100 depicted in FIG. 2A, a Direct Color Systems® Direct Jet 1024 printer is used to apply a black ink (Direct Color Systems®—1-7102-200) to serve as the appliqué 104 across the back surface of a transflective mirror element 108 with an optical transmission of approximately 5% or greater. Circular openings 106 in the appliqué 104 of approximately 1 cm in diameter are created in the printed material. Subsequently, Bostik® 70-08A black adhesive is used as adhesive 112 to fill the openings 106 and to bond the glass to a plastic carrier, e.g., carrier 110. When the mirror assembly 100 is viewed from the front (i.e., above the first substrate 114), there can be a very good match between the appliqué 104 and the openings 106 in the appliqué 104 that are now filled with adhesive 112. The bond strength and cross sectional area of the adhesive bond can be sufficient for supporting the weight of the mirror element 108 even through automotive test procedures.

In an embodiment of mirror assembly 100, a black plastic film can be employed as the appliqué 104, such as a black polyester film with a clear pressure-sensitive adhesive, and applied to the fourth surface 124 of the second substrate 120. At least one opening 106 in the appliqué 104 can be filled with black adhesive 112 as described herein.

It is found that matching the appearance of plastic films employed as the appliqué 104 with an adhesive 112 may be challenging in some cases. For example, adhesive foam (3M™ 4492 black) with openings in the foam (e.g., serving as openings 106) can be used as both an appliqué 104 and as the adhesive 112 to bond a plastic carrier plate 110 to the back of the mirror element 108. When black, liquid adhesive (or another sealant) is further used to fill the openings 106 in the foam adhesive, the foam adhesive (as appliqué 104) and the liquid adhesive often do not match. The foam appears slightly gray and lower gloss when compared to the black adhesive when viewed through the front of the mirror assembly 100. One possible solution is to print a gray ink in the openings 106 to more closely match the color of the foam employed as the appliqué 104.

An appliqué 104 on the back of an electrochromic transflective mirror element 108 may also be used to hide electrical contacts, such as electrical contact 130. If the contact 130 to the mirror element 108 wraps around to the back of the mirror element 108, and if the contact 130 extends beyond the plastic rim or opaque region 136 which hide the seal 134, the contact 130 may be visible from the front of the mirror assembly 100. Contacts 130 that extend into the transflective region of the mirror assembly 100 (e.g., a transmissive portion of the assembly 100 and mirror element 108) and do not match the color or gloss of the appliqué 104 may be visible from the front of the mirror assembly 100 unless measures are taken to hide the contact. It is also conceivable that portions of wires and other electrical attachments connected to the contact 130 could also be visible from the front of the mirror assembly 100. As such, measures taken to obscure the electrical contact 130 from view from the front of the mirror assembly 100 should also be effective in obscuring such other wires and electrical attachments part of or joined to the electrical contact 130.

Figure 3:
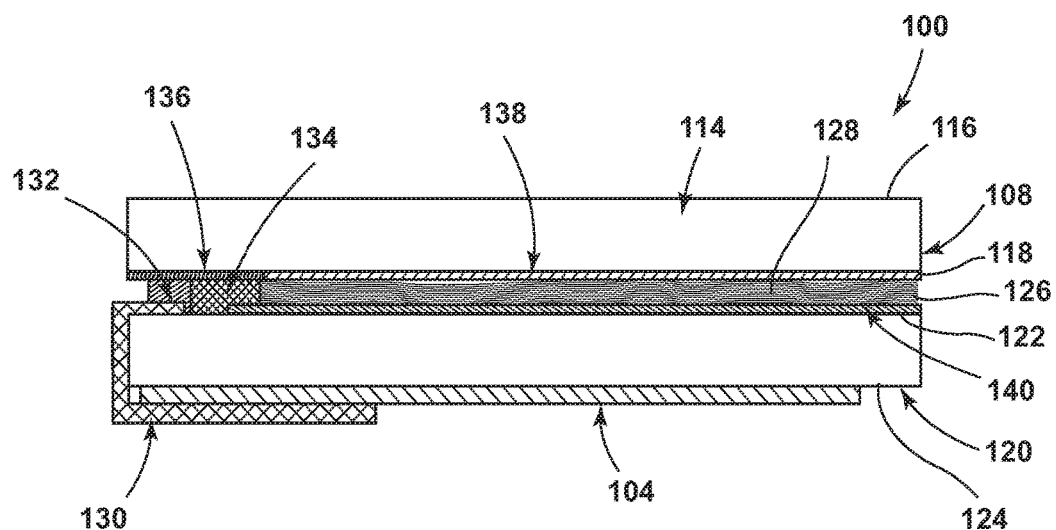
FIG. 3 is a cross-sectional view of a rearview mirror assembly, in accordance with an additional exemplary embodiment.

Applying the appliqué 104 under the electrical contact 130 as shown in FIG. 3 is one embodiment of a construction which hides the non-matching contact. More specifically, at least a portion of the appliqué 104 should be configured to obscure or hide the contact 130, as viewed through the first and second substrates 114 and 120. In some embodiments, the appliqué 104 and at least an extension of the electrical contact 130 over the fourth surface 124 should be configured to match in visual appearance such that appliqué 104 and the extension of the contact 130 are substantially indistinguishable as viewed through the transmissive portions of the first and second substrates 114 and 120 (located toward the front and rear of the mirror assembly 100, respectively) under the conceivable lighting conditions of the application.

As shown in FIG. 3, the appliqué 104 is placed on at least a portion of the fourth surface 124, extending completely or nearly completely under the electrical contact 130. In some embodiments, adhesive (e.g., the adhesive employed as adhesive 112 shown in FIG. 2A) may be employed on the fourth surface 124 to connect the electrical contact 130 to the second substrate 120. For these embodiments, the appliqué 104 may flow (e.g., appliqué 104 as an inkjet layer) or is otherwise (e.g., appliqué 104 is a plastic film) located under the electrical contact 130 and around any adhesive employed to attach the contact 130 to the substrate 120. In at least one embodiment, the mirror assembly 100 includes an opaque region 136 on a portion of the second surface 118 and a seal 134 that is configured substantially between the opaque region 136 and the third surface 122. Further, the extension of the electrical contact 130 over the fourth surface 124 extends past the opaque region 136 such that it may be visible by an observer through the first and second substrates 114 and 120. As such, the appliqué 104 configured under the contact 130 substantially obscures and hides the extension of the electrical contact 130 that is visible through the substrates 114 and 120.

Figure 4:
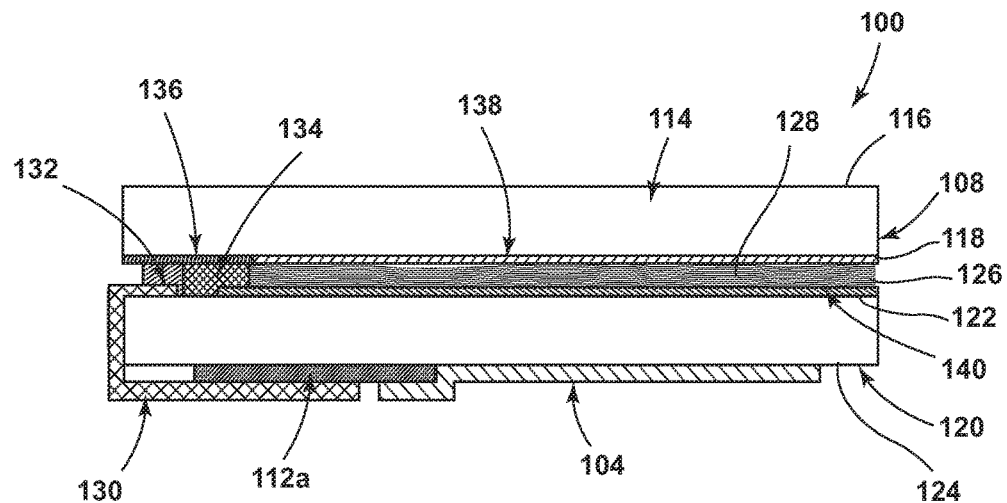
FIG. 4 is a cross-sectional view of a rearview mirror assembly, in accordance with an exemplary embodiment.

Referring to FIG. 4, at least one embodiment of a mirror assembly 100 is depicted with a construction that hides an electrical contact 130. Here, an adhesive pad 112a is located under an extension of the electrical contact 130, and then an appliqué 104 is located or otherwise applied over the transflective portions of the mirror element 108 (e.g., fourth surface 124 of the second substrate 120). Further, a portion of the appliqué 104 is located or otherwise applied over at least the edges of the adhesive pad 112a. The adhesive pad 112a can serve to attach the electrical contact 130 to the fourth surface 124 of the second substrate 120. In some embodiments, the adhesive pad 112a is configured as a dark film or dark adhesive pad.

Further, the appliqué 104 should substantially match the appearance of the pad 112a when viewed from the front of the mirror assembly 100 depicted in FIG. 4. Preferably, the appliqué 104 also substantially matches the visual appearance of the electrical contact 130. Accordingly, the portion of the appliqué 104 over the adhesive pad 112a should be configured to obscure the visual appearance of the extension of the electrical contact 130 and the adhesive pad 112a that might otherwise be visible through the first and second substrates 114 and 120 of the mirror assembly 100. In some embodiments, the adhesive pad 112a and the extension of the electrical contact 130 are configured to match in visual appearance such that the appliqué 104, the adhesive pad 112a and the extension of the electrical contact 130 are substantially indistinguishable as viewed through the first and second substrates 114 and 120. In at least one exemplary embodiment, the mirror assembly 100 can also be configured such that a portion of the appliqué 104 is located over at least a portion of the adhesive pad 112a and a portion of the extension of the electrical contact 130. Such a configuration could be advantageous from a manufacturing standpoint in that only rough dimensional control of the appliqué 104 past the interface between the appliqué 104 and the adhesive pad 112a is necessary.

In some embodiments, the mirror assembly 100 depicted in FIG. 4 includes an opaque region 136 on a portion of the second surface 118 and a seal 134 that is configured substantially between the opaque region 136 and the third surface 122. Further, the adhesive pad 112a may extend past the opaque region 136 such that it is visible by an observer through the substrates 114 and 120. As such, the appliqué 104 can be configured over a portion of the adhesive pad 112a to substantially obscure and hide the pad 112a that is visible through the substrates 114 and 120.

Figure 4A:
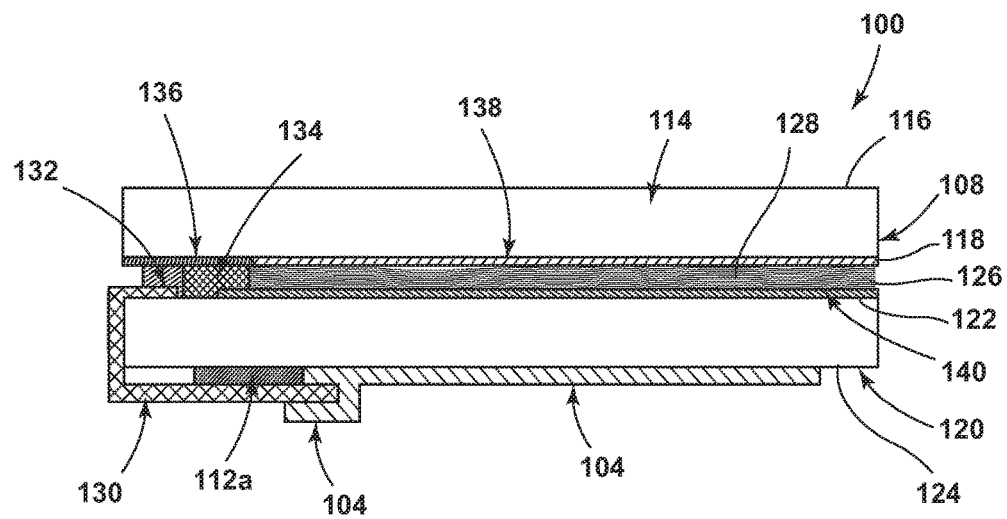
FIG. 4A is a cross-sectional view of rearview mirror assembly, in accordance with an additional exemplary embodiment.

As depicted in FIG. 4A, at least one exemplary embodiment of a mirror assembly 100 can be configured such that a portion of the electrical contact 130 extends past the adhesive pad 112a over the fourth surface 124. The mirror assembly 100 is also configured such that a portion of the adhesive pad 112a extends past the opaque region 136 such that it is visible by an observer through the substrates 114 and 120. As shown in FIG. 4A, the portion of the electrical contact 130 that extends past the pad 112a is also visible through the substrates 114 and 120 as it extends past the opaque region 136. These features (i.e., the portions of adhesive pad 112a and the electrical contact 130) can be obscured or hidden in the configuration of mirror assembly 100 depicted in FIG. 4A by a portion of the appliqué 104 that is located (e.g., for an appliqué 104 that comprises a plastic film), or otherwise wicks (e.g., for an appliqué 104 that comprises an inkjet layer), underneath the extension of the electrical contact 130 and over the fourth surface 124. Here, the appliqué 104 is configured to substantially match the appearance of the adhesive pad 112a and the electrical contact 130, thus ensuring that the portion of the adhesive pad 112a and electrical contact 130 extending past the opaque region 136 are not visible to an observer through the substrates 114 and 120.

The exemplary embodiment of mirror assembly 100 depicted in FIG. 4A can also be modified such that the portion of the adhesive pad 112a that extends past the opaque region 136 also extends completely beneath the electrical contact 130 such that only this portion of the pad 112a is visible through the first and second substrates 114 and 120. In other words, the adhesive pad 112a resides completely beneath the contact 130 and above the fourth surface 124. In this configuration, the appliqué 104 need only butt up against the adhesive pad 112a to effectively obscure it from view through the substrates 114 and 120. In some variants of this configuration of mirror assembly 100, the appliqué 104 can further wick between the adhesive pad 112a and the electrical contact 130, in addition to butting up against the pad 112a.

In some embodiments, ink is used to form the appliqué 104 on the fourth surface 124 of a transflective electrochromic mirror element 108 as shown in, for example, FIG. 3. The ink is applied directly to the fourth surface 124 of the glass substrate 120. A clip used for electrical contact 130 is positioned on top of the appliqué 104. Using this construction, the contact 130 (e.g., a clip) is hidden from view when the mirror element 108 is viewed from the front (e.g., as viewed through substrates 114 and 120). This construction is particularly useful when the optical transmission level of the mirror element 108 is above 30%. For mirror assemblies 100 having mirror elements 108 with particularly high transmission levels, other means of hiding the contact 130, such as applying ink over a clip affixed to the substrate 120 with black adhesive (e.g., as shown in FIG. 4A) may be less effective or ineffective. As such, when the optical transmission of the mirror element 108 is above 30%, the need for a very uniform backing is important and a configuration of mirror assembly 100, such as depicted in FIG. 3, is particularly advantageous.

Figure 5:
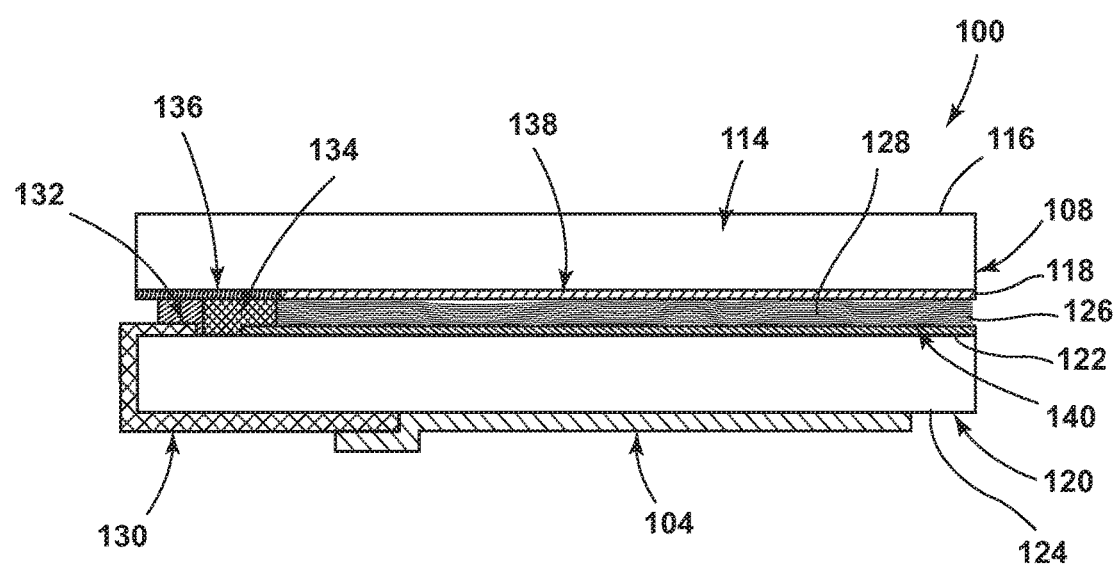
FIG. 5 is cross-sectional view of a rearview mirror assembly, in accordance with a further exemplary embodiment.

In at least one embodiment, a construction of a mirror assembly 100 hides a non-matching contact and includes a contact 130 that comprises a black or dark contact material or a contact material, such as a metal tab, where the side facing the substrate 120 is colored black, for example, with an ink or a sticker. An appliqué 104 of similar color and texture to the contact 130 is applied over the top of the contact 130 as well as across the transflective portion of the mirror assembly 100, e.g., over the fourth surface 124 of the second substrate 120. If the contact 130 and the appliqué 104 are close to the same color and gloss when viewed through the transflective mirror element 108, they will provide a substantially uniform appearance. FIG. 5 illustrates an embodiment of the mirror assembly 100 with this construction.

In some exemplary embodiments of the mirror assembly 100 depicted in FIG. 5, the electrical contact 130 is configured to provide an electrical connection to at least one of the first and second substrates 114 and 120, the contact 130 further possessing an extension over the fourth surface 124 of the second substrate 120. The appliqué 104 is on at least a portion of the fourth surface 124, and has a contact-obscuring region that is located over at least a portion of the extension of the electrical contact 130. Further, the contact-obscuring region of the appliqué 104 and the extension of the electrical contact 130 are configured to substantially match in visual appearance. Hence, an observer looking through the first and second substrates 114 and 120, respectively, will tend to observe the appliqué 104 and contact 130 elements as one uniform feature of similar appearance. Preferably, no clear interfaces between the appliqué 104 and the contact 130 can be observed through the first and second substrates 114 and 120. In some embodiments, the appliqué 104 and the extension of the electrical contact 130 are configured to match in visual appearance such that the appliqué 104 and the extension of the contact 130 are substantially indistinguishable as viewed through the transmissive portions of the first and second substrates 114 and 120, respectively.

In some embodiments, the mirror assembly 100 (see FIG. 5) further includes an opaque region 136 on a portion of the second surface 118. In these embodiments, the extension of the electrical contact 130 is over the fourth surface 124 of the second substrate 120. The extension of the contact 130 also extends past the opaque region 136. Although the extension of the contact 130 might be viewable through the first and second substrates 114 and 120, respectively, of the mirror element 108, the presence of the appliqué 104 over at least a portion of the extension of the electrical contact 130 obscures the interfaces and edges of the contact 130 from view through these substrates. Preferably, the materials employed for the opaque region 136, the appliqué 104 and the side of the extension of the electrical contact 130 facing the fourth surface 124 of the second substrate 120 are selected to substantially match in visual appearance.

According to an embodiment, the appliqué 104 can closely follow the contour of the material employed for the electrical contact 130. Such contour matching can be done by creating the appliqué 104 using a liquid material such as an ink that will flow over the edges of the electrical contact 130. If the appliqué material overlapping the contact 130 does not follow the contact edge closely, an area of discontinuity in the color or gloss is likely to appear adjacent to the contact 130.

In an exemplary embodiment of a mirror assembly 100 consistent with the configuration depicted in FIG. 4, a metal contact clip is employed for the electrical contact 130. The clip is then adhered to the fourth surface 124 of the second substrate 120 of the mirror element 108 using a black adhesive layer for the adhesive pad 112a. The total thickness of the contact 130 and the adhesive pad 112a is greater than 75 μm. At least a portion of the black adhesive layer employed as the pad 112a can be seen through the substrates 114 and 120 when viewed from the front of the mirror element 108. When a black plastic film is used as an appliqué 104 over the back of the mirror element 108 (e.g., over the fourth surface 124 of the second substrate 120), the appliqué 104 extends over the contact 130. As the appliqué 104 is placed over the contact 130, air pockets are created adjacent to the contact 130, configured in the form of metal contact clip. These air pockets create bright areas which reflect more light than either the area where the appliqué 104 is adhered to the glass (e.g., fourth surface 124 of the second substrate 120) or the area where the black clip adhesive serving as pad 112a is adhered to the glass.

Alternatively, this mirror assembly 100 embodiment can be modified such that black ink is employed as the appliqué 104. In this case, the appliqué 104 is printed over and adjacent to the black adhesive layer serving as pad 112a, no such air pockets are evident. The printed ink of the appliqué 104 coats the fourth surface 124 of the second substrate 120 right up to the edge of the adhesive pad 112a (e.g., black adhesive) used to attach the electrical contact 130, a metal clip in these embodiments. Since no air pockets are formed, the area adjacent to the black adhesive pad 112a appears the same as the rest of the glass substrate 120 having the appliqué 104 in the form of printed ink on its fourth surface 124.

One function of an appliqué 104 is that it may be used to improve the shatter resistance of the mirror element 108. For example, a plastic film laminated to the back of a piece of glass (e.g., fourth surface 124 of the second substrate 120) will help hold the pieces of mirror element 108 together if the glass is broken. The material of a printed appliqué 104 may also improve the shatter resistance of the mirror element 108 if the printed material has some elastic properties and/or if fibers are added to the printed material as a reinforcement for the appliqué 104.

Referring to FIGS. 6 and 6A-6D, exemplary embodiments of a mirror assembly 100 are depicted that include first and second substrates 114 and 120. The substrates 114 and 120 are oriented toward the front and rear of the mirror assembly 100, respectively. The substrates 114 and 120 also define a cavity 126 that is at least partially filled with an electro-optic medium 128. In some embodiments, the mirror assembly 100 contains a mirror element 108 that comprises the substrates 114 and 120. In addition, the substrates 114 and 120 are themselves configured comparably to those same elements employed in the embodiments of mirror assembly 100 depicted in FIGS. 2A-5. For example, the first substrate 114 has a first surface 116 and a second surface 118 that is substantially parallel to the first surface 116. The mirror assembly 100 also includes a carrier 110 that is operably connected to at least one of the first substrate 114 and the second substrate 120. In the embodiment depicted in FIG. 6, the carrier 110 is connected to the second substrate 120 via adhesive 112.

Still referring to FIGS. 6 and 6A-6D, the mirror assembly 100 also includes an appliqué 104 in the form of an inkjet appliqué layer directly applied to at least a first, transmissive portion of the fourth surface 124 of the second substrate 120. In some embodiments, the appliqué 104 layer is cured and bonded to the substrate 120 in situ. Accordingly, the appliqué 104 employed for the mirror assembly 100 requires no adhesive or other bonding material to attach to the second substrate 120; consequently, the appliqué 104 is substantially in direct contact with the underlying substrate 120. In addition, the appliqué layer serving as appliqué 104 has an opening 106a over a second, transmissive portion of the fourth surface 124. The mirror assembly 100 also includes an assembly component 142 that is coupled to the carrier 110. The assembly component 142 is located such that it resides behind the fourth surface 124 of the second substrate 120. In some embodiments, the assembly component 142 is substantially coincident with the opening 106a in the appliqué 104.

According to some embodiments of the mirror assembly 100 depicted in FIGS. 6 and 6A-6D, a substantial portion of the mirror element 108 (including substrates 114 and 120, and their surfaces 116, 118, 122 and 124, respectively) is transmissive insofar as it has an optical transmission of 5% or greater. Other portions of the mirror element may be substantially or completely opaque. For example, one half of the mirror element 108 may be substantially or completely opaque, while the other half is semitransparent with an optical transmission of 5% or greater. The mirror element 108 in some embodiments has a substantial portion with an optical transmission with greater than 10%. In at least one embodiment, a substantial portion of the mirror element 108 has an optical transmission of at least approximately 25%. In an additional embodiment, a substantial portion of the mirror element has approximately 20 to 50% optical transmission. Further, a substantial portion of the mirror element 108 can be characterized by approximately 22%, 26%, or 40% optical transmission levels in certain embodiments.

Assembly component 142 employed in the mirror assembly 100 depicted in FIGS. 6 and 6A-6D can take on many forms. For example, the assembly component 142 can be a light source, sensor, optics, light diffuser, display, or some other internal electronic, mechanical, or electro-mechanical feature associated with the mirror assembly 100. In many of the embodiments of the mirror assembly 100 depicted in FIGS. 6 and 6A-6D, the assembly 100 is configured to obscure, block or otherwise minimize the appearance of the assembly component 142 through the transmissive portions of the first and second substrates 114 and 120.

In some applications, the appliqué 104 employed in the mirror assembly 100 depicted in FIGS. 6 and 6A-6D requires a high optical density. For example, when an appliqué 104 has at least one backlit opening (e.g., a light source employed as assembly component 142 in front of opening 106a), it is important to avoid bleed-through of the light through the appliqué 104 adjacent to the opening. For printed appliqués employed as appliqué 104 (e.g., appliqué layers or films derived from a printing process, such as inkjet printing), an ink thickness of 50 to 300 μm may be needed to create a film with an optical density greater than 2. In some embodiments, it is preferable to employ an even thicker inkjet-printed appliqué having an optical density of greater than 3.

On the other hand, if small lines or openings are desired for opening 106a (e.g., for an icon opening), it can be difficult to maintain the design widths of the opening 106a, particularly for thicker (e.g., greater than 50 μm) inkjet-printed appliqué layers employed as appliqué 104. This is because the ink employed for the appliqué 104 may flow on the substrate surface (e.g., fourth surface 124) changing the appearance of the printed image. Even when using a UV-curable ink for the appliqué 104, the time between inkjetting and curing may be over 1 second and the ink can flow, changing the as-printed line widths of the opening 106a. Applying the ink in a thin pass, at least partially curing the ink, and then adding to the thickness of the ink layer with a second pass is one way to produce more accurate line widths for the opening 106a within an inkjet-printed appliqué layer employed as appliqué 104. Another option is to fill the open area of opening 106a with a clear ink which will prevent the optically dense material of the surrounding appliqué 104 from flowing into the opening 106a. In one example, a thin clear ink is applied in the transmissive area of the mirror element 108 intended to define the opening 106a, and then the clear ink is UV-cured. A black ink is printed as the appliqué 104 adjacent to the clear ink, thus defining the opening 106a. As a result, the flow of the black ink is limited in the region that defines opening 106a.

To maintain consistent line widths and opening widths in the opening 106a employed in some embodiments of the mirror assembly 100 depicted in FIGS. 6 and 6A-6D, it is preferred to limit the thickness of an inkjet-printed appliqué layer employed as appliqué 104 to about 50 μm or less. In at least one exemplary embodiment, it is preferred that a ratio of the smallest opening dimension of the opening 106a to the ink thickness of the inkjet layer employed as the appliqué 104 is controlled to be greater than or equal to about 5. The smallest opening dimension is the smallest dimension of the opening 106a, contemplating various shapes of the opening itself. The smallest opening dimension for a rectangular-shaped opening 106a would be the shortest width dimension of the opening. For triangular-shaped openings 106a, the smallest opening dimension would be the height of the triangle.

With regard to those embodiments of mirror assembly 100 employing a controlled ratio of smallest opening dimension-to-inkjet layer thickness, a smallest opening dimension of 300 μm for an opening 106a in the appliqué 104 can be printed with an ink thickness of 100 μm. But with a smallest opening dimension-to-inkjet layer thickness ratio of only 3, the ink flow is fairly significant across the substrate (e.g., fourth surface 124 of the second substrate 120), making line width control difficult. Conversely, when the thickness of the inkjet layer is dropped to 50 μm, the ratio is now 6, and controlling the size and demarcations of the opening 106a is greatly improved.

Preferably, the ratio of the smallest opening dimension-to-the thickness of the inkjet layer employed as the appliqué 104 is set above 5. For example, an inkjet layer of 15 μm can be effectively used for the appliqué 104 to create an opening 106a with a smallest opening dimension of 100 μm, thus providing a ratio of the smallest opening dimension to the thickness of the inkjet layer of approximately 6.7. Even more preferably, the ratio of the smallest opening dimension to the thickness of the inkjet layer is controlled to a value above about 15. Accordingly, it is preferable to employ thinner inkjet layers for the appliqué 104, particularly for applications of mirror assembly 100 having an appliqué 104 defining an opening 106a requiring significant dimensional control over the opening itself.

On the other hand, it is preferable for backlit applications (e.g., those employing a mirror assembly 100 depicted in FIGS. 6 and 6A-6D with an assembly component 142 in the form of a light source) to maintain opacity in the appliqué 104, while employing a thinner inkjet layer. In some cases, adding a diffusing material, e.g., titanium dioxide, to the inkjet layer can be used to increase the optical density of the layer, allowing thinner inkjet layers to be employed for the appliqué 104 in proximity to the opening 106a. The diffusing light scattering material within the appliqué 104 effectively increases the optical path length through the thickness of the ink, thereby reducing the overall transmission for a given thickness.

According to at least one embodiment of mirror assembly 100, narrow lines and openings can be defined as opening 106a in an appliqué 104 by printing the optically dense material first with any large openings and to follow the ink curing process with an ink removal process for smaller openings 106a. In one example, a laser is used to remove or ablate a portion of the ink and to create openings of less than approximately 500 μm in width and lines of less than approximately 500 μm in width. In an additional example, lines and openings with a dimension less than approximately 300 μm can be generated using the laser ablation method. Using laser ablation to create the openings 106a eliminates concerns of excessive inkjet layer flow associated with narrow line width openings and thick ink layers.

Figure 6:
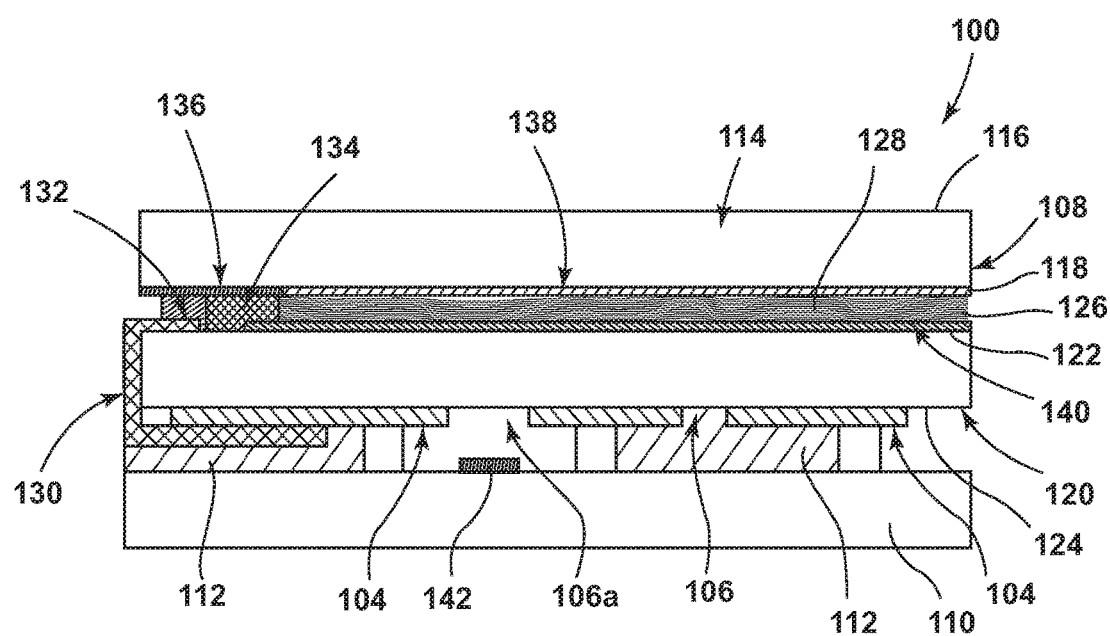
FIG. 6 is cross-sectional view of a rearview mirror assembly, in accordance with an additional exemplary embodiment.
Figure 6A:
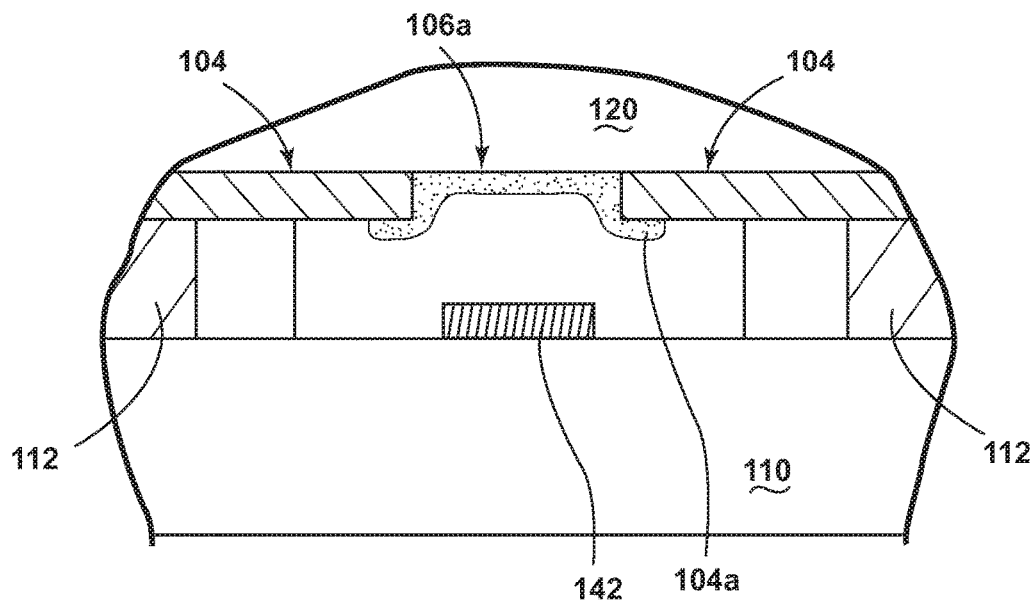
FIG. 6A is an enlarged, cross-sectional view of a rearview mirror assembly, in accordance with a further exemplary embodiment.

According to one embodiment of mirror assembly 100, as shown in FIG. 6A, a light diffusing material 104a can be employed between an assembly component 142 (e.g., a light source) and the viewer to provide more uniform lighting through the opening 106a in the appliqué 104. In particular, the light diffusing material 104a can be placed in the opening 106a and over a portion of the inkjet layer employed as the appliqué 104 in proximity to the opening 106a. For example, adding a light diffusing material 104a into an opening 106a, configured in the form of an icon area, reduces the lighting hot spot seen when backlighting the mirror element 108 with a point source light such as an LED (serving as the assembly component 142). Often, the diffusing material will be a separate piece of light diffusing plastic film added between the appliqué 104 and the light source serving as the assembly component 142. If the appliqué 104 is printed directly onto the rear surface of the glass (e.g., fourth surface 124 of the second substrate 120), it is possible to print a light diffusing material which flows both over the appliqué 104 and into the icon area of opening 106a, thereby improving the lighting uniformity of the backlit icon.

According to some embodiments, the light diffusing material 104a is adhered to the fourth surface 124 of the substrate 120 within the opening 106a, and a portion of the appliqué 104 (e.g., an inkjet layer) in proximity to the opening 106a. Here, the portion of the light diffusing material 104a in proximity to the opening 106a is defined by a substantially annular region for a circular-shaped opening 106a that extends at least about 0.2 mm past the opening. In some embodiments, the portion of the light diffusing material 104a extends at least about 0.1 mm past the opening 106a. Similarly, the portion of the light diffusing material 104a that extends past a noncircular-shaped opening 106a will be substantially shaped to match the shape of the opening 106a.

In an exemplary embodiment, the mirror assembly 100 depicted in FIG. 6A is configured to ensure adequate light output for a light source serving as the assembly component 142, while at the same time reducing any light hot spots. The light diffusing material 104a should be characterized by approximately 25% or greater optical transmission for this purpose. Preferably, the optical transmission of the light diffusing material 104a should be higher than 55% and, even more preferably, higher than 65%. Furthermore, in order to mask the lighting hot spot, the haze value of the light diffusing material 104a should be greater than 85% and, preferably, greater than 89%. These properties associated with these embodiments of mirror assembly 100 can be achieved with various loadings by weight of 5% to 95% of metal oxide particles including, but not limited to, $TiO_2$, $CaCO_3$, and $BaSO_4$. Further desired properties associated with the light diffusing material 104a can be achieved by changing the texture of the material 104a to create various lensing effects to increase light scattering.

Figure 6B:
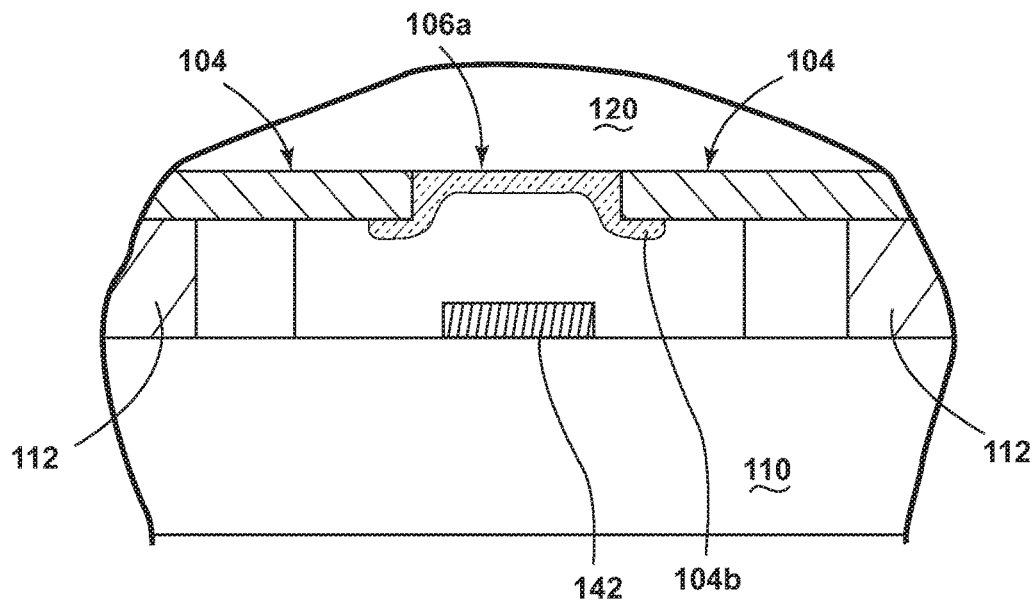
FIG. 6B is an enlarged, cross-sectional view of a rearview mirror assembly, in accordance with an exemplary embodiment.

Referring to FIG. 6B, an exemplary embodiment of mirror assembly 100 is depicted that includes a semitransparent inkjet layer 104b employed between an assembly component 142 (e.g., a light source) and the viewer to better obscure the assembly component 142 from view through the substrates 114 and 120. In particular, semitransparent layer 104b can be placed in the opening 106a and over a portion of the inkjet layer employed as the appliqué 104 in proximity to the opening 106a. For example, adding a semitransparent inkjet layer 104b into an opening 106a, configured in the form of an icon area, obscures a light source, acting as the assembly component 142, attached to the carrier 110. In some embodiments, the semitransparent inkjet layer 104b is tinted to produce a coloring effect in the opening 106a, particularly when shaped in the form of an icon.

Still referring to FIG. 6B, in scenarios in which the mirror element 108 has greater than 5% transmission, components, or features may unintentionally become visible in the opening 106a in the appliqué 104. Some components, such as assembly component 142, residing behind the mirror element 108 may reflect light back through the opening 106a in the appliqué 104 and become visible. For example, assembly component 142 can comprise glare sensor components, a display, a light diffuser, an LED, and/or other electronic components that reflect light and become visible through the substrates 114 and 120 when the optical transmission through the mirror element 108 and through the opening 106a in the appliqué 104 is above 15%. At levels below 15% optical transmission, the visibility through these openings 106a is decreased, and the assembly component 142 can be concealed.

Concealing the openings 106a in the appliqué 104 and concealing components (e.g., assembly component 142) behind the openings is desirable for several reasons. From a design standpoint, it may be aesthetically pleasing to hide any component that breaks the continuity of the reflected image or offsets symmetry. From a safety and driver comfort standpoint, it may be distracting for a visual aberration to be viewable in the mirror element 108 of the mirror assembly 100.

To conceal assembly component 142 in the embodiments of mirror assembly 100 depicted in FIG. 6B, it is possible to selectively reduce the optical transmission in the opening 106a in an effort to conceal the component 142 behind the mirror element 108. The optical transmission of the opening 106a can be modified by printing a semitransparent inkjet layer 104b in the form of a uniform light filter or one that is selectively graded or patterned to achieve the desired transmission locally where it is needed. A printed light filter employed as the layer 104b may use any combination of clear, colored, or black inks to modify the light transmission through the opening 106a. Alternately, when the appliqué 104 comprises a plastic film, it may be configured with a plurality of openings 106a, each with the modified optical transmission levels indicative of a semitransparent layer 104b that are required to conceal the assembly components 142 configured behind the substrates 114 and 120 of the mirror element 108. Once the assembly component 142, such as a glare light sensor, is no longer visible to the operator, it can be placed in any position on the carrier 110 behind the mirror element 108—e.g., substantially coincident with or offset from the opening 106a. This allows for the component 142, e.g., a sensor, to be placed in the most desirable location to maximize its function and/or manufacturability as well as to maintain design intentions.

In one example, a mirror element 108 has approximately 22% total visible light transmission. A generally opaque appliqué 104 is printed on the fourth surface 124 of the second substrate 120 of the mirror element 108, and a light diffuser is placed behind an opening 106a in the appliqué 104. When the mirror element 108 is placed in front of a housing element, e.g., carrier 110 the opening 106a with the light diffuser can be easily seen in typical ambient lighting conditions (e.g., within a vehicle) since the light diffuser reflects back a portion of the light that passes through the opening 106a. The prior example can be modified according to one exemplary embodiment of mirror assembly 100 depicted in FIG. 6B. In particular, a semitransparent inkjet layer 104b with approximately 68% visible light transmission is printed over the area of the opening 106a. The area of the opening 106a would effectively have a total light transmission of 15%. In some embodiments, a light diffuser (serving as assembly component 142) can be located behind the opening 106a and the semitransparent inkjet layer 104b, and the mirror element 108 is placed in front of a housing element. Advantageously, the opening 106a with the light diffuser, acting as assembly component 142, cannot be easily seen with typical ambient lighting conditions (e.g., within a vehicle).

In at least one example, a mirror element 108 has an approximately 40% visible light transmission. A generally opaque appliqué 104 is printed on the fourth surface 124 of the second substrate 120 of the mirror element 108, and a glare sensor and associated optics are placed behind an opening 106a in the appliqué 104. When the mirror element 108 is placed in front of the carrier 110 or other housing element, the opening 106a with the glare sensor optics can be easily seen in typical ambient lighting conditions (e.g., within a vehicle) since the glare sensor optics reflect back a portion of the light that passes through the opening 106a. The prior example can be modified according to a further exemplary embodiment of the mirror assembly 100 depicted in FIG. 6B. In particular, a semitransparent inkjet layer 104b with approximately 38% or less visible light transmission is printed over the area of the opening 106a. The area of the opening 106a would then have a total light transmission of 15%. Accordingly, in this exemplary embodiment of mirror assembly 100, a glare sensor and optics can serve as the assembly component 142, and these components can be placed behind the opening 106a and the semitransparent inkjet layer 104b. The mirror element 108 can be located in front of the housing element. Consequently, the glare sensor and optics cannot be easily seen with typical ambient lighting conditions (e.g., within a vehicle).

Additional configurations of the mirror assembly 100 depicted in FIG. 6B are also available. The assembly component 142 can be configured as a light source or a sensor, for example. Further, the mirror element 108 can be characterized, for example, by an approximately 26% or 22% optical transmission, an optical transmission range of approximately 20 to 50%, and other optical transmission levels. To achieve a total light transmission of 15% or less through the opening 106a, the semitransparent layer 104b employed in the opening 106a can be configured with an optical transmission of 58% or less, 68% or less, or other levels, depending on the optical transmission of the mirror element 108. In general, the total light transmission through the opening 106a is the product of the transmission levels of the element 108 and the semitransparent layer 104b. These combinations can thus be employed in the mirror assembly 100 to effectively obscure assembly components 142 mounted, for example, to the carrier 110.

Figure 6C:
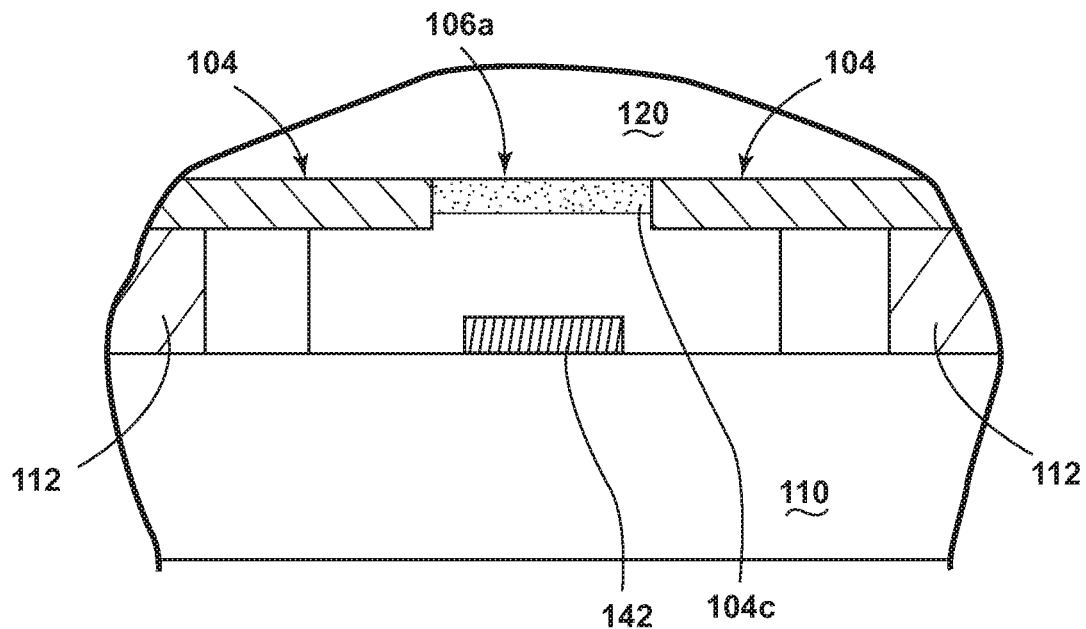
FIG. 6C is an enlarged, cross-sectional view of a rearview mirror assembly, in accordance with an additional exemplary embodiment.

In some exemplary embodiments of mirror assembly 100, as shown in FIG. 6C, the appliqué 104 can be provided with an opacity gradient layer 104c to eliminate a sharp edge that might otherwise be visible if the appliqué 104 had an essentially opaque area directly adjacent to the opening 106a. When viewed from the front of the mirror element 108 (e.g., through the first and second substrates 114 and 120) the edge of the appliqué 104 may be easily seen, especially when the mirror element 108 employs a transflective layer 140 (e.g., a transflective coating) with high optical transmission. Here, the appliqué 104 is set at a first optical density and the opacity gradient layer 104c is set at a second optical density, preferably below the first optical density associated with the majority of the appliqué 104. In one example, the second optical density of the opacity gradient layer 104c is created by the printing of "dots" or the like of the same or similar material as employed in the appliqué 104 with space between the "dots." In effect, the second optical density of the layer 104c, with its spaces between "dots," is lower than the first optical density associated with the majority of the appliqué 104. Creating a gradient in the appliqué 104 in the form of opacity gradient layer 104c in the opening 106a provides some optical transmission without a sharp transition.

In one exemplary embodiment, the opening 106a defines a sensor eyehole for an assembly component 142 in the form of a light sensor. The appliqué 104 can be printed using a Direct Color Systems® printer. Black ink is used to create a generally opaque coating on the back of a transflective mirror element 108 (e.g., fourth surface 124 of the second substrate 120) with approximately 26% transmission. The sensor eyehole area (e.g., opening 106a) can then be generated using an opacity gradient layer 104c in the form of a varying density of dots in a gradient pattern such that the center of the eyehole in opening 106a is transparent. Preferably, the opacity gradient layer 104c is configured such that is characterized by approximately 58% or less optical transmission when the mirror element 108 has approximately 26% transmission. It is also preferable to prepare the gradient layer 104c with an optical transmission of approximately 38% or less when the transmission of the mirror element 108 is approximately 40%. In additional embodiments, it is preferable to set the gradient layer 104c with an optical transmission of 68% or less when the transmission of the mirror element 108 is approximately 22%. Further, in some embodiments, the mirror element 108 can be characterized by an approximately 20 to 50% optical transmission, with adjustments to the gradient layer 104c to achieve the desired total light transmission level through the opening 106a. Other optical transmission levels are also feasible. Ultimately, each of these embodiments of mirror assembly 100, as depicted in FIG. 6C, can achieve a total light transmission of 15% or less through the opening 106a of the mirror element 108.

Figure 6D:
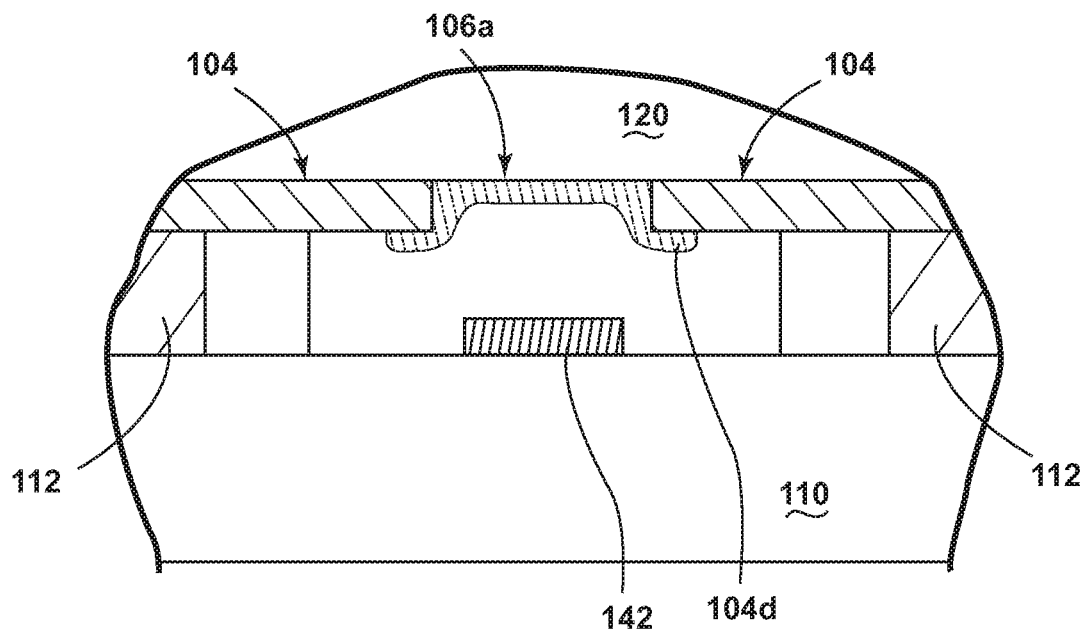
FIG. 6D is an enlarged, cross-sectional view of a rearview mirror assembly, in accordance with a further exemplary embodiment.

In an exemplary embodiment of mirror assembly 100, as shown in FIG. 6D, a color filter 104d can be employed in the opening 106a formed in the appliqué 104. In particular, inkjet layers employed as appliqués 104 may also contain various colors so that black may be used in the majority of the area, but specific colors may be used in the icon areas (e.g., opening 106a). For example, if white light LEDs, serving as assembly component 142, are used to illuminate more than one icon, the icon area of opening 106a may contain a printed color filter 104d.

In some embodiments of mirror assembly 100 shown in FIG. 6D, it is preferable to employ the printed color filter 104d in the opening 106a and over a portion of the inkjet layer as appliqué 104 in proximity to the opening 106a. In some cases, it is advantageous to lower the transmission of one icon area in comparison to another. Adding a gray semitransparent ink (or CMY gray) as color filter 104d to the icon area of opening 106a may provide the desired transmission. Tinting the icon area and, particularly, the openings 106a, also provides a stealthier, less visible icon when viewed through the mirror assembly 100.

According to additional exemplary embodiments of mirror assembly 100, the color filter 104d can be adhered to the fourth surface 124 of the substrate 120 within the opening 106a, and a portion of the inkjet layer (appliqué 104) in proximity to the opening 106a. Here, the portion of the color filter 104d in proximity to the opening 106a is defined by a substantially annular region for a circular-shaped opening 106a that extends at least 0.2 mm past the opening. Similarly, the portion of the color filter 104d that extends past a noncircular-shaped opening 106a will be substantially shaped to match the shape of the opening 106a.

One advantage of the mirror assembly 100 embodiments depicted in FIGS. 6A-6D is that they can be employed individually or in combination to control the light output of multiple assembly components 142, particularly LED light sources, within the icon area of a mirror element 108 containing one or more openings 106a. For example, some icons, indicators, or the like of a given mirror assembly 100 may require a brighter LED source for use in connection with a "warning" icon, and other icons in the same mirror assembly 100 may require a lower light output level. By using a semitransparent layer 104b (see FIG. 6B and corresponding description) and/or a color filter 104d (see FIG. 6D and corresponding description) in one or more openings 106a, the overall light output and/or color associated with these openings and particular assembly components 142 (e.g., LED light sources) can be adjusted. In doing so, it is possible to tailor the light output of one or more openings 106a to create different light output levels and/or accommodate one or more LED light sources with the same or varying output levels. Further, it is possible to employ teachings associated with the exemplary embodiments depicted in FIGS. 6A-6D (e.g., color filters, semitransparent layers, light diffusing layers, and/or opacity gradient layers) within the same opening 106a or multiple openings 106a in a given mirror assembly 100, depending on the application. For example, a color filter 104d and a light diffusing material 104a could conceivably be employed within the same opening 106a to create a single icon with varying light output effects.

Figure 7:
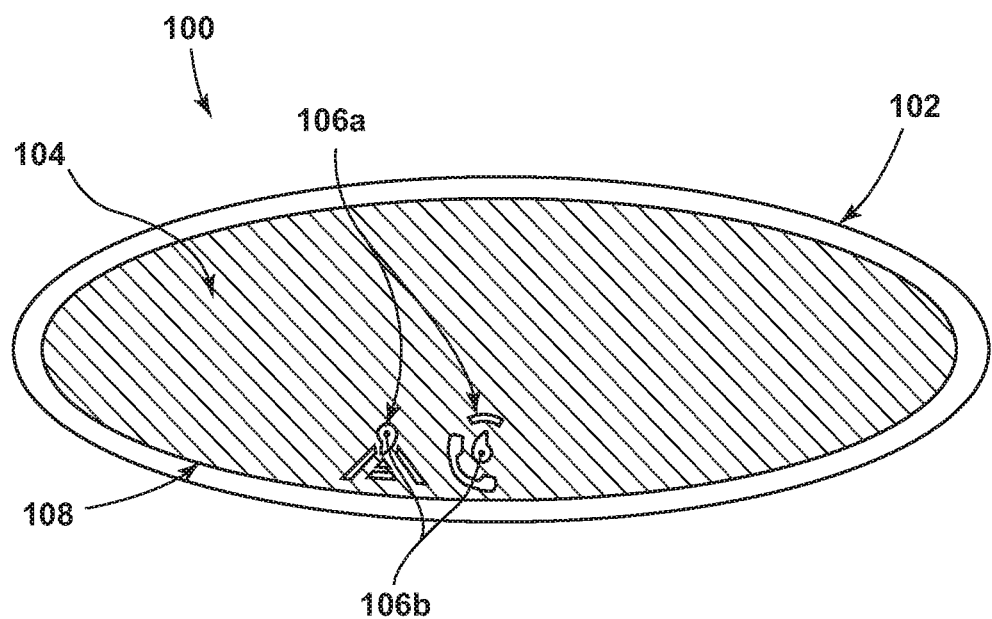
FIG. 7 is a front-view diagram of a rearview mirror assembly, in accordance with an additional exemplary embodiment.

Referring to FIG. 7, an exemplary embodiment of the mirror assembly 100 is depicted with one or more openings 106a having complex icon features in the transmissive portion of mirror element 108. It is advantageous to employ appliqué 104 in the form of an inkjet layer for the development of the opening(s) 106a. As depicted in FIG. 7, the icon features in the openings 106a possess one or more discontinuous elements 106b. The discontinuous elements 106b, and the remaining portions of the appliqué 104 within the mirror element 108, can be printed in as little as one pass when the appliqué 104 is in the form of an inkjet layer. Line widths and the particular dimensions of the openings 106a and discontinuous elements 106b can be controlled according to the parameters outlined earlier in this specification. For example, one can control the smallest dimension of the discontinuous elements 106b within the openings 106a in view of the inkjet layer thickness to a ratio of greater than or equal to 5.

It should be understood that appliqué 104 in the form of an inkjet layer can be employed advantageously within the mirror assembly 100 for one or more purposes or functions. For example, appliqué 104 in the form of an inkjet layer can be effectively employed to mask features (e.g., electrical contact 130 as depicted in FIGS. 2A-5 and described in the foregoing). The appliqué 104 in the form of an inkjet layer can also define openings 106a and the appearance of features substantially coincident with the openings 106a (e.g., assembly component 142 in FIGS. 6A-6D and described in the foregoing). Still further, the appliqué 104 in the form of an inkjet layer can be employed to create complex openings 106a with discontinuous elements 106b (as shown in FIG. 7) in the transmissive region of the mirror assembly 100. Hence, the use of an inkjet layer for appliqué 104 can be particularly advantageous as an inkjet printer can be employed to deposit the layer(s) for the appliqué 104 according to various functions with a limited number of passes and manufacturing steps.

For purposes of the present disclosure, and as will be explained in greater detail herein below, the electro-optic medium 128 can comprise at least one solvent, at least one anodic material, and at least one cathodic material.

Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

The electro-optic medium 128 is preferably chosen from one of the following categories:

(I) Single-layer, single-phase—The electro-optic medium 128 may comprise a single-layer of material which may include small non-homogenous regions, and include solution-phase devices where a material may be contained in solution in an ionically conducting electrolyte which remains in solution in the electrolyte when electrochemically oxidized or reduced. Solution-phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Preselected Color," all of which are hereby incorporated herein by reference in their entirety including all references incorporated and/or cited therein.

The anodic and cathodic materials may also be combined or linked by a bridging unit as described in U.S. Pat. No. 6,241,916 entitled "Electrochromic System" and/or U.S. Pat. No. 6,519,072 A1 entitled "Electrochromic Device," which are hereby incorporated herein by reference in their entirety including all references incorporated and/or cited therein. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety including all references incorporated and/or cited therein.

It is also possible to link anodic materials or cathodic materials by similar methods. The concepts described in these patents can further be combined to yield a variety of electroactive materials that are linked or coupled, including linking of a redox buffer, such as linking of a color-stabilizing moiety, to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety including all references incorporated and/or cited therein.

The concentration of the electrochromic materials can be selected as taught in U.S. Pat. No. 6,137,620 entitled "Electrochromic Media With Concentration-Enhanced Stability, Process For The Preparation Thereof and Use In Electrochromic Devices," which is hereby incorporated herein by reference in its entirety including all references incorporated and/or cited therein.

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices," which is hereby incorporated herein by reference in its entirety including all references incorporated and/or cited therein.

(II) Multi-layer—The electro-optic medium 128 may also be prepared in layers and include a material attached directly to an electrically conducting electrode or confined in close proximity thereto which remains attached or confined when electrochemically oxidized or reduced.

(III) Multi-phase—The electro-optic medium 128 may further be prepared using multiple phases where one or more materials in the medium undergoes a change in phase during the operation of the device, for example a material contained in solution in the ionically conducting electrolyte forms a layer on the electrically conducting electrode when electrochemically oxidized or reduced.

Generally, the exemplary embodiments herein may be configured to define a convex element, an aspheric element, a planar element, a non-planar element, an element having a wide field of view (FOV), or a combination of these various configurations in different areas to define a mirror element 108 with generally complex shape. In case of an electrochromic rearview mirror assembly 100, the first surface 116 of the first substrate 114 may comprise a hydrophilic or hydrophobic coating to improve the operation. The embodiments of the reflective elements may comprise an anti-scratch layer on the exposed surfaces of at least one of the first and second substrates 114 and 120. Examples of various reflective elements are described in U.S. Pat. Nos. 5,682,267, 5,689,370, 5,825,527, 5,940,201, 5,998,617, 6,020,987, 6,037,471, 6,057,956, 6,062,920, 6,064,509, 6,111,684, 6,166,848, 6,193,378, 6,195,194, 6,239,898, 6,246,507, 6,268,950, 6,356,376, 6,441,943, and 6,512,624. The disclosure of each of these patents is incorporated herein in its entirety by reference.

The embodiments disclosed herein may be used with a mounting system such as that described in U.S. Pat. Nos. 8,201,800; 8,210,695; 9,174,577; 9,838,653; 8,925,891; 8,814,373; 8,201,800; 8,960,629; and 9,244,249; and U.S. Provisional Patent Application No. 61/704,869, which are hereby incorporated herein by reference in their entirety. Further, the embodiments of this disclosure may be used with a rearview packaging assembly such as that described in U.S. Pat. Nos. 8,264,761; 8,885,240; 8,646,924; 8,814,373; 8,643,931; and 9,316,347; and U.S. Provisional Patent Application No. 61/707,625, which are hereby incorporated herein by reference in their entirety. Additionally, it is contemplated that embodiments of this disclosure can include a bezel such as that described in U.S. Pat. Nos. 8,201,800; 8,210,695; and U.S. patent application Ser. No. 13/271,745, now U.S. Pat. No. 8,827,517, which is hereby incorporated herein by reference in its entirety.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An electro-optic assembly, comprising:
    a front substrate having a first surface and a second surface substantially parallel to the first surface;
    a rear substrate spaced from and substantially parallel to the front substrate, the rear substrate having a third surface and a fourth surface substantially parallel to the third surface;
    an electrical contact for providing an electrical connection to an electrode in proximity to an electro-optic material, the contact having an extension at least partially over a transmissive portion of the fourth surface in a transmissive region of the rear substrate, wherein the transmissive region is configured to transmit light from the fourth surface to the first surface of the front substrate;
    an adhesive pad disposed between a portion of the electrical contact and the transmissive portion of the fourth surface; and
    an appliquè on at least the transmissive portion of the fourth surface abutting the adhesive pad, the appliquè having a contact-obscuring region in proximity to the extension of the electrical contact,
    wherein the electro-optic material is disposed between the second surface and the third surface.

2. The electro-optic assembly according to claim 1, wherein the contact-obscuring region of the appliquè is configured to obscure the visual appearance of the extension of the electrical contact through the front and rear substrates.

3. The electro-optic assembly according to claim 1, wherein the appliquè layer forms an opening forming the at least partially transmissive portion of the fourth surface.

4. The electro-optic assembly according to claim 3, wherein a ratio of a smallest dimension of the opening to a thickness of the appliquè layer is 5 or greater.

5. The electro-optic assembly according to claim 3, wherein a ratio of a smallest dimension of the opening to a thickness of the appliquè layer is 10 or greater.

6. The electro-optic assembly according to claim 1, further comprising:
    a mirror element comprising the front substrate and the rear substrate, the mirror element having a portion with an optical transmission greater than 10%.

7. The electro-optic assembly according to claim 1, further comprising:
    a transflective layer on the third surface of the rear substrate.

8. An electro-optic assembly, comprising:
    a front substrate having a first surface and a second surface substantially parallel to the first surface;
    a rear substrate spaced from and substantially parallel to the front substrate, the rear substrate having a third surface and a fourth surface substantially parallel to the third surface;
    an electrical contact for providing an electrical connection to an electrode in proximity to an electro-optic material, the contact having an extension at least partially over a transmissive portion of the fourth surface forming a transmissive region extending from the rear substrate to the front substrate;

an adhesive pad disposed on the transmissive portion of the fourth surface between the extension of the electrical contact and the fourth surface; and an appliquè on at least the transmissive portion of the fourth surface, the appliquè having an obscuring region adjacent to at least a portion of the adhesive pad, wherein an adhesive pad appearance is configured to match an appliquè appearance through the transmissive region, wherein the electro-optic material is disposed between the second surface and the third surface.

9. The electro-optic assembly according to claim 8, wherein the obscuring region of the appliquè is configured to obscure the visual appearance of the adhesive pad and the extension of the electrical contact through the front and rear substrates.

10. The electro-optic assembly according to claim 8, wherein the appliquè forms an opening configured to pass light through the appliquè.

11. The electro-optic assembly according to claim 8, wherein the appliquè layer has a thickness of about 50 μm or less.

12. An electro-optic assembly, comprising:
  a front substrate having a first surface and a second surface substantially parallel to the first surface;
  a rear substrate spaced from and substantially parallel to the front substrate, the rear substrate having a third surface and a fourth surface substantially parallel to the third surface;
  an electrical contact for providing an electrical connection to an electrode in proximity to an electro-optic material;
  an adhesive pad disposed between a portion of the electrical contact and a transmissive portion of the fourth surface; and
  an appliquè disposed between the electrical contact and the fourth surface abutting the adhesive pad on the transmissive portion of the fourth surface, wherein the appliquè forms an opening configured to pass light through the appliquè from the fourth surface to the first surface, and
  wherein the electro-optic material is disposed between the second surface and the third surface.

13. The electro-optic assembly according to claim 12, wherein the electrical contact comprises an extension at least partially over the transmissive portion of the fourth surface in a transmissive region of the rear substrate.

14. The electro-optic assembly according to claim 13, wherein the appliquè comprises a contact-obscuring region that is located over at least a portion of the extension of the electrical contact.

15. The electro-optic assembly according to claim 12, wherein the opening comprises a smallest dimension forming a ratio with an ink thickness of an inkjet-printed layer.

16. The electro-optic assembly according to claim 15, wherein the ratio of the opening to the ink thickness is greater than or equal to 5.

17. The electro-optic assembly according to claim 12, wherein the appliquè layer forms an optical density gradient proximate the opening.

18. The electro-optic assembly according to claim 12, wherein the optical density of the appliquè layer decreases in proximity to the opening.

19. The electro-optic assembly according to claim 1, wherein an adhesive pad appearance is configured to match an appliquè appearance through the transmissive region.

* * * * *